US011111178B2

(12) United States Patent
Wang

(10) Patent No.: US 11,111,178 B2
(45) Date of Patent: Sep. 7, 2021

(54) RENEWABLE ADMIXTURES FOR CEMENTITIOUS COMPOSITIONS

(71) Applicant: THE BOARD OF TRUSTEES OF THE UNIVERSITY OF ALABAMA, Tuscaloosa, AL (US)

(72) Inventor: Jialai Wang, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 125 days.

(21) Appl. No.: 16/388,000

(22) Filed: Apr. 18, 2019

(65) Prior Publication Data

US 2019/0382308 A1 Dec. 19, 2019

Related U.S. Application Data

(60) Provisional application No. 62/686,405, filed on Jun. 18, 2018.

(51) Int. Cl.
| | |
|---|---|
| *C04B 24/06* | (2006.01) |
| *C04B 28/18* | (2006.01) |
| *C04B 28/04* | (2006.01) |
| *C04B 28/24* | (2006.01) |
| *C04B 24/02* | (2006.01) |
| *C04B 40/00* | (2006.01) |
| *C04B 14/00* | (2006.01) |
| *C04B 28/26* | (2006.01) |
| *C04B 111/26* | (2006.01) |
| *C04B 103/22* | (2006.01) |

(52) U.S. Cl.
CPC ............ *C04B 24/06* (2013.01); *C04B 14/005* (2013.01); *C04B 24/02* (2013.01); *C04B 28/04* (2013.01); *C04B 28/188* (2013.01); *C04B 28/24* (2013.01); *C04B 28/26* (2013.01); *C04B 40/0046* (2013.01); *C04B 2103/22* (2013.01); *C04B 2111/26* (2013.01)

(58) Field of Classification Search
CPC ....... C04B 14/005; C04B 24/02; C04B 24/06; C04B 28/04; C04B 28/188; C04B 28/24; C04B 28/26; C04B 2103/22; C04B 40/0046; C04B 2111/26; C04B 7/32; C04B 14/06; C04B 14/04; C04B 14/043; C04B 14/10; C04B 14/304; C04B 20/006; C04B 20/008; C04B 22/064; C04B 24/34; C04B 24/2641; C04B 28/02
See application file for complete search history.

(56) References Cited

U.S. PATENT DOCUMENTS

2003/0162866 A1 * 8/2003 Prat .................. C04B 24/02
524/2

FOREIGN PATENT DOCUMENTS

| CN | 104591626 | A | * | 5/2015 |
| CN | 104909822 | A | * | 9/2015 |
| CN | 105130345 | A | * | 12/2015 |
| CN | 105837100 | A | * | 8/2016 |
| CN | 108129096 | A | * | 6/2018 |
| JP | 2018052766 | A | * | 4/2018 |

OTHER PUBLICATIONS

Abrams, Duff, Effect of Tannic Acid on the Strength of Concrete, Bulletin 7, Structural Materials Research Laboratory, Lewis Institute, Chicago, http://www.cement.org/pdf_files/LS007.pdf, 1920,34 pages (available through PCAas LS007).
ASTM C150-07 Standard Specification for Portland Cement, ASTM International, West Conshohocken, PA, 2007, https://doi.org/10.1520/C0150-07.
ASTM C1679-17 Standard Practice for Measuring Hydration Kinetics of Hydraulic Cementitious Mixtures Using Isothermal Calorimetry, ASTM International, West Conshohocken, PA, 2017, https://doi.org/10.1520/C1679-17.
ASTM C1702-17 Standard Test Method for Measurement of Heat of Hydration of Hydraulic Cementitious Materials Using Isothermal Conduction Calorimetry, ASTM International, West Conshohocken, PA, 2017, http://doi.org/10.1520/C1702-17.
ASTM C192/C192M-16a Standard Practice for Making and Curing Concrete Test Specimens in the Laboratory, ASTM International, West Conshohocken, PA, 2016, https://doi.org/10.1520/C0192_C0192M-16A.
ASTM C94/C94M-16b Standard Specification for Ready-Mixed Concrete, ASTM International, West Conshohocken, PA, 2016, http://doi.org/10.1520/C0094_C0094M-16B.
Bakolas, A., et al. "Evaluation of pozzolanic activity and physicomechanical characteristics in metakaolin-lime pastes." Journal of Thermal Analysis and Calorimetry 84.1 (2006): 157-163.
Borges, J.O. Costa, N.B. Milestone, C.J. Lynsdale, R.E. Streatfield, Carbonation of CH and C—S—H in composite cement pastes containing high amounts of BFS, Cem. Concr. Res. 40 (2010) 284-292.

(Continued)

*Primary Examiner* — Anthony J Green
(74) *Attorney, Agent, or Firm* — Meunier Carlin & Curfman LLC

(57) ABSTRACT

Cementitious compositions comprising a hydraulic cementitious material, a compound selected from the group consisting of a polyhydroxy aromatic compound, a polycarboxylic acid-containing compound or a salt thereof, ascorbic acid or a salt thereof, or a combination thereof, and a particulate material or a water soluble silicate-containing material that interacts with the compound are described herein. The polyhydroxy aromatic compound can be a water soluble compound having from two to thirty hydroxyl groups. The particulate material can exhibit a particle size distribution, wherein at least about 90% by weight of the particles have a diameter of less than 2 mm. Suitable particulate materials include nanoparticles and microparticles. The cementitious compositions can be used to form building materials. The cementitious compositions are especially suited for inhibiting corrosion of reinforcing steel bars embedded in concrete mixtures. Methods of making and using the cementitious composition are also disclosed.

24 Claims, 13 Drawing Sheets

(56) References Cited

OTHER PUBLICATIONS

Bortzmeyer, D., et al. "Microstructure and mechanical properties of macrodefect-free cements." Journal of materials science 30.16 (1995): 4138-4144.
Broomell, Chris C., et al. "Critical role of zinc in hardening of Nereis jaws." Journal of Experimental Biology 209.16 (2006): 3219-3225.
Cha, Hyung Joon, Dong Soo Hwang, and Seonghye Lim. "Development of bioadhesives from marine mussels." Biotechnology Journal: Healthcare Nutrition Technology 3.5 (2008): 631-638.
Costa, Eunice, et al. "Tannic acid mediated suppression of PNIPAAm microgels thermoresponsive behavior." Macromolecules 44.3 (2011): 612-621.
Deming, Timothy J. "Mussel byssus and biomolecular materials." Current opinion in chemical biology 3.1 (1999): 100-105.
Dierendonck, Marijke, et al. "Nanoporous hydrogen bonded polymeric microparticles: facile and economic production of cross presentation promoting vaccine carriers." Advanced Functional Materials 24.29 (2014): 145-173.
Ejima, Hirotaka, et al. "One-step assembly of coordination complexes for versatile film and particle engineering." Science 341. 6142 (2013): 154-157.
Erel-Unal, Irem, and Svetlana A. Sukhishvili. "Hydrogen-bonded multilayers of a neutral polymer and a polyphenol." Macromolecules 41.11 (2008): 3962-3970.
Fan, Hailong, et al. "Supramolecular hydrogel formation based on tannic acid." Macromolecules 50.2 (2017): 666-676.
Fathima, et al., An eco-benign tanning system using aluminium, tannic acid, and silica combination, J. Am. Leather Chem. Assoc. 2004, 99, 73-81.
Faure, Emilie, et al. "Catechols as versatile platforms in polymer chemistry." Progress in polymer science 38.1 (2013): 236-270.
Fei, Xiaoma, et al. "Efficient toughening of epoxy-anhydride thermosets with a biobased tannic acid derivative." ACS Sustainable Chemistry & Engineering 5.1 (2016): 596-603.
Guan, Yu, et al. "Bio-inspired natural polyphenol cross-linking poly (vinyl alcohol) films with strong integrated strength and toughness." RSC Advances 6.74 (2016): 69966-69972.
Guo, Junling, et al. "Engineering multifunctional capsules through the assembly of metal-phenolic networks." Angewandte Chemie International Edition 53.22 (2014): 5546-5551.
Hagerman, Ann E., et al. "High molecular weight plant polyphenolics (tannins) as biological antioxidants." Journal of agricultural and food chemistry 46.5 (1998): 1887-1892.
Harrington, Matthew J., and J. Herbert Waite. "pH-dependent locking of giant mesogens in fibers drawn from mussel byssal collagens." *Biomacromolecules* 9.5 (2008): 1480-1486.
Harrington, Matthew J., et al. "Collagen insulated from tensile damage by domains that unfold reversibly: In situ X-ray investigation of mechanical yield and damage repair in the mussel byssus." Journal of structural biology 167.1 (2009): 47-54.
Harrington, Matthew J., et al. "Iron-clad fibers: a metal-based biological strategy for hard flexible coatings." Science 328.5975 (2010): 216-220.
Hashem, F. S., M. S. Amin, and S. M. A. El-Gamal. "Improvement of acid resistance of Portland cement pastes using rice husk ash and cement kiln dust as additives." Journal of thermal analysis and calorimetry 111.2 (2013): 1391-1398.
Heidari-Rarani, M., et al. "Mechanical durability of an optimized polymer concrete under various thermal cyclic loadings—An experimental study." Construction and Building Materials 64 (2014): 308-315.
Heijmen, F. H., et al. "Cross-linking of dermal sheep collagen with tannic acid." Biomaterials 18.10 (1997): 749-754.
Horev, Benjamin, et al. "pH-activated nanoparticles for controlled topical delivery of farnesol to disrupt oral biofilm virulence." ACS nano 9.3 (2015): 2390-2404.
Kuhlmann, and H. Paschmann, The ecological position of Cement and Concrete. ZKG International (1997) 50,1-8.
Kim, Hee Joong, et al. "Reverse osmosis nanocomposite membranes containing graphene oxides coated by tannic acid with chlorine-tolerant and antimicrobial properties." Journal of Membrane Science 514 (2016): 25-34.
Kord Forooshani, Pegah, and Bruce P. Lee. "Recent approaches in designing bioadhesive materials inspired by mussel adhesive protein." Journal of Polymer Science Part A: Polymer Chemistry 55.1 (2017): 9-33.
Kozlovskaya, Veronika, et al. "Hydrogen-bonded LbL shells for living cell surface engineering." Soft Matter 7.6 (2011): 2364-2372.
Lee, Haeshin, Norbert F. Scherer, and Phillip B. Messersmith. "Single-molecule mechanics of mussel adhesion." Proceedings of the National Academy of Sciences 103.35 (2006): 12999-13003.
Lee, S. M., Pippel, E., Gösele, U., Dresbach, C., Qin, Y., Chandran, C. V., . . . & Knez, M. (2009). Greatly increased toughness of infiltrated spider silk. Science, 324(5926), 488-492.
Liu, Jingliang, et al. "Adsorption of tannic acid from aqueous solution by aminopropyl functionalized SBA-15." Desalination and Water Treatment 56.2 (2015): 475-484.
Oh, Dongyeop X., et al. "A rapid, efficient, and facile solution for dental hypersensitivity: The tannin-iron complex." Scientific reports 5 (2015): 10884.
Park, Hyeoneun, et al. "Strength development and hydration behavior of self-activation of commercial ground granulated blast-furnace slag mixed with purified water." Materials 9.3 (2016): 185.
Quideau, Stephane, et al. "Plant polyphenols: chemical properties, biological activities, and synthesis." Angewandte Chemie International Edition 50.3 (2011): 586-621.
Shutava, Tatsiana, et al. "pH responsive decomposable layer-by-layer nanofilms and capsules on the basis of tannic acid." Macromolecules 38.7 (2005): 2850-2858.
Sileika, Tadas S., et al. "Colorless multifunctional coatings inspired by polyphenols found in tea, chocolate, and wine." Angewandte Chemie International Edition 52.41 (2013): 10766-10770.
Tam, Shuk-Ching, and John G. McColl. "Aluminum- and calcium-binding affinities of some organic ligands in acidic conditions." Journal of Environmental Quality 19.3 (1990): 514-520.
Van Oss, G. Hendrik, and A.C. Padovani, Cement Manufacture and the Environment: Part II: Environmental Challenges and Opportunities. Journal of Industrial Ecology (2003) 7, 93-126.
Van Oss, Hendrik G., and Amy C. Padovani. "Cement manufacture and the environment: part I: chemistry and technology." Journal of Industrial Ecology 6.1 (2002): 89-105.
Waite, J. Herbert, and Marvin L. Tanzer. "Polyphenolic substance of Mytilus edulis: novel adhesive containing L-dopa and hydroxyproline." Science 212.4498 (1981): 1038-1040.
Waite, J. Herbert. "Nature's underwater adhesive specialist." International Journal of Adhesion and Adhesives 7.1 (1987): 9-14.
Wei, Qiang, and Rainer Haag. "Universal polymer coatings and their representative biomedical applications." Materials Horizons 2.6 (2015): 567-577.
Werneke, S. W., et al. "The role of metals in molluscan adhesive gels." Journal of experimental biology 210.12 (2007): 2137-2145.
Wilker, Jonathan J. "The iron-fortified adhesive system of marine mussels." Angewandte Chemie International Edition 49.44 (2010): 8076-8078.
Yang, Chen, et al. "Coordination-enabled one-step assembly of ultrathin, hybrid microcapsules with weak pH-response." ACS applied materials & interfaces 7.17 (2015): 9178-9184.
Yang, Shuyan, et al. "Preparation of NBR/Tannic acid composites by assembling a weak IPN structure." Composites Science and Technology 153 (2017): 40-47.
Yen, Kai Cheng, and Eamor M. Woo. "Formation of dendrite crystals in poly (ethylene oxide) interacting with bioresourceful tannin." Polymer bulletin 62.2 (2009): 225.
Yeon, Kyu-Seok, et al. "Deformation behavior of acrylic polymer concrete: Effects of methacrylic acid and curing temperature." Construction and Building Materials 63 (2014): 125-131.
Zhang, Xi, et al. "Polyphenol coating as an interlayer for thin-film composite membranes with enhanced nanofiltration performance." ACS applied materials & interfaces 8.47 (2016): 32512-32519.

\* cited by examiner

RENEWABLE ADMIXTURES FOR CEMENTITIOUS COMPOSITIONS

CROSS-REFERENCE TO RELATED APPLICATIONS

This application claims the benefit of and priority to U.S. Patent Application No. 62/686,405 filed on Jun. 18, 2018, the disclosure of which is expressly incorporated herein by reference in its entirety.

STATEMENT REGARDING FEDERALLY SPONSORED RESEARCH

This invention was made with Government Support under Grant No. 1563551 awarded by the National Science Foundation. The Government has certain rights in the invention.

FIELD

The present disclosure generally relates to cementitious compositions, particularly to the inclusion of renewable materials in cementitious compositions to improve the compositions' mechanical properties and durability.

BACKGROUND

Portland cement has become one of the indispensable primary materials in civil engineering because of its many irreplaceable advantages such as ease of application and availability of raw materials. The production of Portland cement, however, releases a large amount of greenhouse gases. To combat global climate change, the carbon footprint of Portland cement-based concrete should be reduced. This can be achieved through enhancing the performance of concrete so that less cement is needed in concrete or longer service-life of concrete can be reached.

It has been shown that the properties of concrete can be improved by adding another bonding material in addition to cement. Such bonding materials include polymeric additives which have been extensively studied over last few decades. M. Heidari-Rarania, et al. *Constr. Build. Mater.* 64 (2014) 308-315; K.-S. Yeon, et al. *Constr. Build. Mater.* 63 (2014) 125-131; and D. Bortzmeyer, et al., *J. Mater. Sci.* 30 (1995) 4138-4144. Polymeric additives, however, are generally based on petroleum, which are not only nonrenewable and environmentally unfriendly, but also add considerable cost to the concrete.

There is a need for renewable cementitious materials to combat global climate change. The compositions and methods disclosed herein address these and other needs.

SUMMARY

In accordance with the purposes of the disclosed systems and methods, as embodied and broadly described herein, the disclosed subject matter relates to cementitious compositions and methods of making and using the same. The cementitious compositions can comprise a) a hydraulic cementitious material, b) a hydroxyl containing compound selected from the group consisting of a polyhydroxy aromatic compound, a polycarboxylic acid-containing compound or a salt thereof, ascorbic acid or a salt thereof, and a combination thereof and present in an amount of from 0.1% to 3% by weight, based on the total weight of the cementitious material, and c) a water soluble silicate-containing material or a particulate material that can interact with the hydroxy containing compound. In the cementitious compositions, at least a portion of the hydroxy containing compound is adsorbed to a surface of the water-soluble silicate-containing material or particulate material through covalent and/or noncovalent interactions.

The hydraulic cementitious material present in the cementitious compositions can be selected from Portland cement such as ordinary Portland cement, calcium aluminate cement, calcium phosphate cement, calcium sulfate hydrate, calcium aluminate sulfonate cement, magnesium oxychloride cement, magnesium oxysulfate cement, magnesium phosphate cement, and combinations thereof. In specific examples, the hydraulic cementitious material comprises ordinary Portland cement.

The hydroxyl containing compound present in the cementitious compositions can be a water soluble compound having two or more hydroxyl groups, such as from two to thirty hydroxyl groups. In some embodiments, the hydroxyl containing compound can have a molecular weight of from 50 g/mol to 9000 g/mol, preferably from 50 g/mol to 3000 g/mol. In some examples, the hydroxyl containing compound can be a polyhydroxy aromatic compound such as a polyphenol such as a tannin and a proanthocyanidin. An example of a tannin include tannic acid or can be derived from a tannin extract such as a vegetable tannin extract. In other examples, the hydroxyl containing compound can include a polyhydroxy phenol such as catechol, gallic acid, or combinations thereof. In further examples, the hydroxyl containing can include a polycarboxylic acid or a salt thereof, such as citric acid or a salt thereof. In even further examples, the hydroxyl containing can include ascorbic acid or a salt thereof acid. The hydroxyl containing compound can be present in the cementitious compositions in an amount of from 0.1% to 1.5% by weight, preferably from 0.1% to 0.5% by weight, based on the total weight of the cementitious material.

The particulate material that can interact with the hydroxyl containing compound can have a particle size distribution, wherein at least about 90% by weight of the particles have a diameter of less than 2 mm, preferably less than 1 mm, more preferably less than 50 microns, most preferably less than 10 microns. For example, the particulate material can be selected from nanoparticles, microparticles, or combinations thereof. Suitable examples of particulate materials that can interact with the hydroxyl containing compound include silica, clay, fiber, calcium silicate hydrate, calcium aluminate, magnesium oxide, lime, wollastonite, a water soluble silicate salt, or mixtures thereof. The particulate material can be present in an amount of from 0.1% to 30% by weight, based on the total weight of the cementitious material and the hydroxyl containing compound. In specific examples, the particulate material can comprise nanoparticles, and the nanoparticles can be present in an amount of 5% by weight or less, preferably from 0.2% to 5% by weight, more preferably from 0.2% to 3% by weight, based on the total weight of the cementitious material and the hydroxy containing compound. In other examples, the particulate material can comprise microparticles, and the microparticles can be present in an amount of 30% by weight or less, preferably from 5% to 30% by weight, based on the total weight of the cementitious material and the hydroxyl containing compound.

The compositions can include a water soluble silicate containing material such as a water soluble silicate salt. The water soluble silicate salt can be present in an amount of 5% by weight or less, preferably from 0.1% to 5% by weight, more preferably from 0.2% to 3% by weight, based on the total weight of the cementitious material and the hydroxyl containing compound.

The cementitious compositions can include aggregates, that is in addition to the particulate material or water soluble silicate-containing material that can interact with the hydroxyl containing compound. Examples of such aggregates include gravel and crushed stones such as crushed limestone. The cementitious compositions can be used to make building materials including concrete, tiles, bricks, pavers, panels, or synthetic stones.

Methods of making a cementitious composition comprising mixing a hydroxyl containing compound and a particulate material that can interact with the hydroxyl containing compound to form a slurry having a pH value greater than 4 (such as greater than 5, greater than 6, or greater than 7), and blending the slurry with a hydraulic cementitious material to produce a cementitious mixture are disclosed.

Methods of making a cementitious composition comprising mixing a hydroxyl containing compound and a water soluble silicate salt to form a suspension having a pH value greater than 4 (such as greater than 5, greater than 6, or greater than 7), and blending the suspension with a hydraulic cementitious material to produce a cementitious mixture are also disclosed. The water soluble silicate salt is provided as an aqueous solution and/or can be reacted with an aqueous solution of a calcium salt prior to mixing with the cementitious material. Suitable calcium salts include calcium nitrate, calcium acetate, calcium chloride, and mixtures thereof.

The methods of making the cementitious compositions described herein can further include hydrating the cementitious mixture to form the cementitious compositions. In some embodiments, the cementitious compositions can develop a compressive strength that is the same or at least about 0.1 MPa greater than the compressive strength of an identical composition not including the hydroxyl containing compound and the particulate material or silicate-containing material after curing for 3 days. In some embodiments, the cementitious composition develops a compressive strength of at least about 20% or greater or 10 MPa greater than the compressive strength of an identical composition not including the hydroxyl containing compound and the particulate material or silicate-containing material after curing for 28 days.

Methods for improving corrosion resistance of reinforcing steel bars embedded in concrete, comprising embedding the reinforcing steel bars in a cementitious composition described herein are also disclosed.

Additional advantages of the disclosed process will be set forth in part in the description which follows, and in part will be obvious from the description, or can be learned by practice of the disclosed process. The advantages of the disclosed process will be realized and attained by means of the elements and combinations particularly pointed out in the appended claims. It is to be understood that both the foregoing general description and the following detailed description are exemplary and explanatory only and are not restrictive of the disclosed process, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification illustrate several aspects described below.

FIG. 5A shows sparse amount of hydration particles deposited on sand. FIG. 5B shows a dense layer of hydration particles deposited on sand treated with tannic acid. White bar=1 micron.

FIG. 6A) and derivative mass loss (DTG; FIG. 6B) of concrete samples mixed with tannic acid at 0.3% by weight of the cement after curing for 28 days.

DETAILED DESCRIPTION

Figure 1:
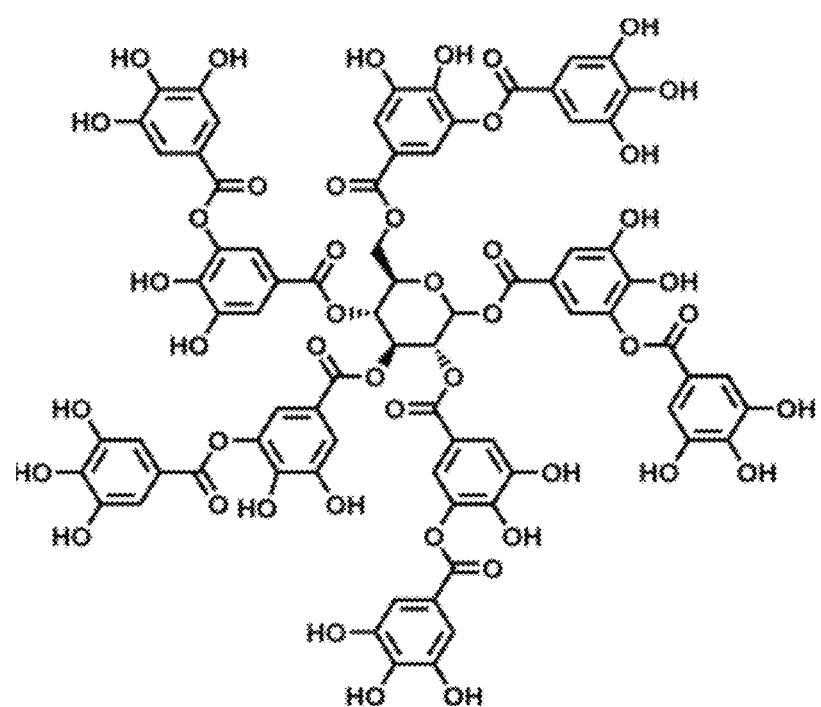
FIG. 1 is a diagram showing the chemical structure of tannic acid.

The materials, compounds, compositions, articles, and methods described herein can be understood more readily by reference to the following detailed description of specific aspects of the disclosed subject matter and the Examples and Figures included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an additive" includes mixtures of two or more such additives, reference to "the cementitious material" includes mixtures of two or more such cementitious materials, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt %) of a component, unless specifically stated to the contrary, is based on the total weight of the formulation or composition in which the component is included.

Reference will now be made in detail to specific aspects of the disclosed materials, compounds, compositions, formulations, articles, and methods, examples of which are illustrated in the accompanying Examples and Figures.

Compositions

Concrete is considered a three-phase composite: bulk cement paste, aggregate, and the interfacial transition zone between the other two phases. Many concrete properties are controlled by the interfacial transition zone. For example, the interfacial transition zone is considered to be the weakest link effecting both durability and mechanical properties of concrete. The bond strength between the aggregate and cement paste in concrete generally provides a stronger interfacial transition zone. Disclosed herein are cementitious compositions comprising renewable additives that enhance bonding within the composition thereby providing improved mechanical properties and durability. In some embodiments, the cementitious compositions comprise a cementitious material, a polyhydroxy aromatic compound, and a particulate material that can interact with the polyhydroxy aromatic compound. Methods for making and using the cementitious compositions are also disclosed herein.

Cementitious Materials

The term "cementitious," as used herein refers to a binder including cement; but is not limited to materials traditionally recognized as cements. In some embodiments, the cementitious material can be a hydraulic cement. Hydraulic cement, as used herein, includes materials that after combination with water, set and harden as a result of chemical reactions, even in the presence of excess water. The hydraulic cementitious material can include Portland cement (such as ordinary Portland cement), alumina cements (such as calcium aluminate cement (CAC)), calcium sulphoaluminate cements (also described as sulphoaluminate belite cements such as calcium aluminate sulfonate (CAS)), calcium phosphate cements, calcium sulfate hydrate cements, magnesium oxychloride (MOC) cements, magnesium oxysulfate (MOS) cements, magnesium phosphate cements, pozzolanic slags, fuel ashes, or a combination thereof.

In some examples, the cementitious material can include Portland cement. Portland cement is the most common form of hydraulic cementitious material. As used herein the term "Portland cement" refers to a hydraulic cement that not only hardens by reacting with water but also forms a water-resistant product comprising hydraulic calcium silicates. Portland cement includes Portland cements described in ASTM C150, however, it is to be understood that Portland cement is not limited to these classes.

In some examples, the cementitious material can include calcium aluminate cement (CAC). CAC is also known in the art as "aluminous cement," "high-alumina cement," and "Ciment fondu." CAC is a unique class of cement that is different from ordinary Portland cement (OPC), particularly due to its chemical make-up. CAC has a high alumina content, e.g., greater than 30 wt % up to 80 wt %. During the manufacturing process of CAC, other calcium aluminate and calcium silicate may be formed, as well as compounds containing relatively high proportions of iron oxides, magnesia, titanic, sulfates, and alkalis.

In some examples, the cementitious material can include calcium aluminate sulfonate (CAS) cement. CAS cements can have variable compositions, but all of them contain a significant fraction of Ye'elimite, also called Klein's salt or tetracalcium trialuminate sulfate. CAS can also have minor amounts of phases such as C2S, CA, C4AF, CS, CSH2, where C is CaO, S is $SiO_2$, A is $Al_2O_3$, F is $Fe_2O_3$, S is $SO_3$, M is MgO, T is $TiO_2$, and H is $H_2O$.

The cementitious material can include calcium fluoroaluminate (CFA) cement. CFA can have the chemical formula $11CaO.7Al_2O_3.CaF_2$. CFA can be used in cold weather.

In some examples, the cementitious material can include calcium sulfate based cements. Different morphological forms of calcium sulfate can be used in various embodiments of the cementitious compositions. Suitable examples of calcium sulfate cements include calcium sulfate dihydrate (gypsum), calcium sulfate hemihydrate (stucco), and anhydrous calcium sulfate (sometimes called calcium sulfate anhydrite). These calcium sulfate cements can be from naturally available sources or produced industrially.

In some examples, the cementitious material can include calcium sulfate hemihydrate (also referred to herein as stucco). Stucco can be made from flue gas desulfurization—a byproduct of coal combustion.

The cementitious material can include calcium phosphate cement (CPC). CPC comprises one or more calcium orthophosphate powders, which upon mixing with water or an aqueous solution, form a paste that is able to set and harden primarily as hydroxyapatite.

In some examples, the cementitious material can also include magnesium oxychloride (MOC). MOC cement is also known in the art as "Sorel" or "magnesite". MOC cement is formed from a magnesium oxide and magnesium chloride solution.

The cementitious material can include magnesium oxysulphate (MOS). MOS cement is formed from magnesium oxide and magnesium sulfate solution. The cementitious material can also include magnesium phosphate cement. Magnesium phosphate cement is a mixture of magnesium oxide and phosphoric acid, which forms water-soluble magnesium dihydrogen phosphate $[Mg(H_2PO_4)_2.nH_2O]$ as a reaction product.

The cementitious material can include one or more of the cementitious materials described herein. For example, the cementitious material can include Portland cement only, a Portland cement blend or other hydraulic cements including pozzolanic-lime cements or slag-lime cements. In regards to the Portland cement blends, it is understood that the Portland cement may contain supplementary cementitious materials including pozzolanic materials, lime, fly ash, mortar, ground granulated blast furnace slag (GGBS), silica fume, calcined clay, calcined shale, refractory cements, gypsum, expanding cements, sand, rice hull ash, quartz, silica, amorphous silicon dioxide, cement asbestos board (CAB), calcium aluminate cement (CA) or the like. Examples of Portland cement blends include Portland blast-furnace slag cement, Portland-fly ash cement, Portland pozzolanic cement, Portland silica fume cement, masonry cement and expansive cement.

The cementitious material can be present in the cementitious compositions in amounts from 5% to 99.9% by weight of the cementitious composition. For example, the cementitious material can be present in the cementitious composition in an amount of 10 wt % or greater, 20 wt % or greater, 30 wt % or greater, 40 wt % or greater, 50 wt % or greater, 60 wt % or greater, 70 wt % or greater, 75 wt % or greater, 80 wt % or greater, 85 wt % or greater, 90 wt % or greater, 95 wt % or greater, 96 wt % or greater, 97 wt % or greater, 98 wt % or greater, 99 wt % or greater, 99.5 wt % or greater, or 99.7 wt % or greater, based on the weight of the cementitious composition. In some embodiments, the cementitious material can be present in an amount of 99.9 wt % or less, 99.5 wt % or less, 99 wt % or less, 98 wt % or less, 95 wt % or less, 90 wt % or less, 85 wt % or less, 80 wt % or less, 75 wt % or less, 70 wt % or less, 65 wt % or less, 60 wt % or less, or 55 wt % or less, based on the weight of the cementitious composition. In some embodiments, the cementitious material can be included in an amount of from 5 wt % to 99.9 wt %, from 10 wt % to 99.9 wt %, from 50 wt % to 98 wt %, from 50 wt % to 90 wt %, from 60 wt % to 98 wt %, or from 65 wt % to 95 wt %, based on the weight of the cementitious composition.

Hydroxyl Containing Compound

As described herein, the cementitious compositions include a hydroxy containing compound. The hydroxy containing compound can be naturally occurring, synthetic, or combinations thereof. Preferably, the hydroxy containing compound is naturally occurring. The term "naturally occurring" as used herein refers to a material that can be found and is obtained from nature.

In some embodiments, the hydroxyl containing compound can be a polyhydroxy aromatic compound including a monocyclic or polycyclic polyhydroxy aromatic compound, which has at least two hydroxyl groups on the aromatic ring or on at least one of the aromatic rings in a polycyclic compound. In some examples, the polyhydroxy aromatic compound can comprise 2 or more, 3 or more, 4 or more, 5 or more, 6 or more, 7 or more, 8 or more, 9 or more, 10 or more, 11 or more, 12 or more, 13 or more, 14 or more, 15 or more, 16 or more, 17 or more, 18 or more, 19 or more, 20 or more, 21 or more, 22 or more, 23 or more, 24 or more, 25 or more, 26 or more, 27 or more, 28 or more, 28 or more, or 30 or more hydroxyl groups on the aromatic ring or in the polycyclic aromatic compound. In some examples, the polyhydroxy aromatic compound can comprise from 2 to 35, from 2 to 30, from 3 to 30, from 5 to 30, from 10 to 30, or from 10 to 25 hydroxyl groups on the aromatic ring or in the polycyclic aromatic compound.

The polyhydroxy aromatic compound can have an aromaticity of greater than 50%, such as 60% or greater, 65% or greater, 70% or greater, 75% or greater, 80% or greater, 85% or greater, 90% or greater, or 95% or greater by weight of the polyhydroxy aromatic compound. In some embodiments, the polyhydroxy aromatic compound can have an aromaticity of from greater than 50% to 98%, from 60% to 98%, from 75% to 95%, or from 95% to 90% by weight of the polyhydroxy aromatic compound. The term "aromaticity" as used herein refers to a chemical property in which a conjugated ring of unsaturated bonds, lone pairs, or empty orbitals exhibit a stabilization stronger than would be expected by the stabilization of conjugation alone.

In some examples, the polyhydroxy aromatic compound includes monocyclic 6-membered-ring aromatic compounds (including carbocyclic and heterocyclic rings) having at least two or at least three hydroxyl groups substituted in the ring. Examples of suitable monocyclic 6-membered-ring aromatic compounds include catechol, 1,2,3-trihydroxy benzene (pyrogallol) 1,2,4-trihydroxy benzene (hydroxyhydroquinone), and 1,3,5-trihydroxy benzene (phloroglucinol). The monocyclic 6-membered ring aromatic compounds can include substituents other than hydroxyl groups, examples of which include 2,4,6-trihydroxy benzaldehyde, 2,3,4-trihydroxy acetophenone, 2,4,6-trihydroxy acetophenone, tetrahydroxy-p-quinone dehydrate, 2,3,4-trihydroxy benzoic acid, 3,4,5-trihydroxy benzoic acid (gallic acid), propyl gallate, and 2,4,6-trihydroxy benzoic acid.

In some examples, the polyhydroxy aromatic compounds can include a polycyclic aromatic compound having at least three hydroxyl groups substituted into one or more of the rings present. In specific examples, the polyhydroxy aromatic compound can include a polyphenol. Examples of suitable polyphenol compounds include, for example, purpurogallin, 1,2,4-trihydroxy anthraquinone (purpurin), 2,4,6-trihydroxy benzophenone, proanthocyanidins, and tannins. In some examples, the polyhydroxy aromatic compounds used in the compositions disclosed herein include a tannin, a proanthocyanidin, or a combination thereof. The tannin can be tannic acid and/or derived from a tannin extract such as a vegetable tannin extract. Proanthocyanidins are polyphenols and can be found in a variety of plants such as grape seed. Chemically, the proanthocyanidin can be an oligomeric flavonoids, for example, oligomers of catechin and epicatechin and their gallic acid esters. Other proanthocyanidins can be more complex, having the same polymeric building block, and can form tannins. In some examples, the polyhydroxy aromatic compounds can include an oligomeric or polymer flavonoid.

In other embodiments, the hydroxyl containing compound can include a plurality of carboxylic acids. For example, the hydroxyl containing compound can comprise 1 or more, 2 or more, 3 or more, 4 or more, or 5 or more carboxylic acid groups. In some examples, the hydroxyl containing compound can be a polycarboxylic acid such as citric acid or a salt thereof.

In further embodiments, the hydroxyl containing compound can include ascorbic acid or a salt thereof.

The hydroxyl containing compound can be a weak acid or a weak base. For example, the hydroxyl containing compound can have a pKa of 4 or greater, 4.5 or greater, 5 or greater, 5.5 or greater, 6 or greater, 6.5 or greater, 7 or greater, 7.5 or greater, 8 or greater, 8.5 or greater, 9 or greater, or 9.5 or greater. In some embodiments, the hydroxyl containing compound can have a pKa of 12 or less, 11.5 or less, 11 or less, 10.5 or less, 10 or less, 9.5 or less, or 9 or less. In some embodiments, the hydroxyl containing compound can have a pKa of from 4 to 12, from 4.5 to 12, from 4.5 to 11, from 5 to 11, from 6 to 11, or from 7 to 11. The hydroxyl containing compound for use in the cementitious compositions is preferably a water soluble compound. In some examples, the hydroxyl containing compound can be soluble in water at room temperature and pressure (25° C. and 1 atm) in an amount of greater than about 40% by weight (e.g., 45% or greater, 50% or greater, 55% or greater, 60% or greater, 65% or greater, 70% or greater, 75% or greater, 80% or greater, 85% or greater, 90% or greater, or 95% or greater). In some examples, the hydroxyl containing compound can be completely soluble in water at room temperature. In some embodiments, the hydroxyl containing compound can have a water solubility of greater than 1 g/100 g water at 20° C. (for example, 2 g/100 g water or greater, 5 g/100 g water or greater, 10 g/100 g water or greater, 15 g/100 g water or greater, 20 g/100 g water or greater, or 25 g/100 g water or greater).

The hydroxyl containing compound can have an average molecular weight of 50 g/mol or greater (e.g., 100 g/mol or greater, 150 g/mol or greater, 200 g/mol or greater, 250 g/mol or greater, 500 g/mol or greater, 550 g/mol or greater, 750 g/mol or greater, 800 g/mol or greater, 1000 g/mol or greater, 1200 g/mol or greater, 1400 g/mol or greater, 1500 g/mol or greater, 1800 g/mol or greater, 2000 g/mol or greater, 2500 g/mol or greater, 3000 g/mol or greater, 3500 g/mol or greater, 4000 g/mol or greater, 4500 g/mol or greater, 5000 g/mol or greater, 5500 g/mol or greater, 6000 g/mol or greater, 6500 g/mol or greater, 7000 g/mol or greater, 7500 g/mol or greater, 8000 g/mol or greater, 8500 g/mol or greater, or 9000 g/mol or greater). In some cases, the hydroxyl containing compound have an average molecular weight of 9000 g/mol or less (e.g., 8000 g/mol or less, 7000 g/mol or less, 6000 g/mol or less, 5000 g/mol or less, 4000 g/mol or less, 3000 g/mol or less, 2500 g/mol or less, 2000 g/mol or less, 1800 g/mol or less, 1600 g/mol or less, 1500 g/mol or less, 1200 g/mol or less, 1000 g/mol or less, 800 g/mol or less, or 500 g/mol or less). In some cases, the hydroxyl containing compound have an average molecular weight of from 50 g/mol to 9000 g/mol, from 500 g/mol to 9000 g/mol, from 50 g/mol to 5000 g/mol, or from 50 g/mol to 3000 g/mol.

The hydroxyl containing compounds can be present in the cementitious composition in amounts from 0.1% to 5% based on the total weight of cementitious material. For example, the hydroxyl containing compounds can be present in an amount of 0.1% or greater, 0.15% or greater, 0.2% or greater, 0.25% or greater, 0.3% or greater, 0.35% or greater, 0.4% or greater, 0.45% or greater, 0.5% or greater, 1% or greater by weight, 1.5% or greater by weight, 2% or greater by weight, 2.5% or greater by weight, 3% or greater by weight, or 3.5% or greater by weight, based on the total weight of cementitious material. In some embodiments, the hydroxyl containing compounds can be present in an amount of 5% or less, 4% or less, 3% or less, 2.5% or less, 2% or less, 1.5% or less, 1% or less, 0.8% or less, 0.7% or less, 0.6% or less by weight, 0.5% or less by weight, 0.4% or less by weight, 0.35% or less by weight, or 0.3% or less by weight, based on the total weight of cementitious material. In some embodiments, the hydroxyl containing compounds can be included in an amount from 0.1% to 3% or 0.1% to 1% by weight, based on the total weight of cementitious material.

Particulate Materials

The cementitious compositions can also include a particulate material and/or a water soluble material that can interact with the hydroxyl containing compound. The particulate material can be of varying sizes as would be understood by those of skill in the art. In some embodiments, the cementitious compositions can include particulate materials defined by a sieve size of 8 or greater, a sieve size of 16 or greater, a sieve size of 30 or greater, a sieve size of 50 or greater, a sieve size of 100 of greater, or a sieve size of 200 or greater.

In some examples, the cementitious compositions can include particulate materials that interact with the hydroxyl containing compound having a median particle size diameter of 2 mm or less. For example, the particulate materials that interact with the hydroxyl containing compound can have a median ($D_{50}$) particle size diameter of 1.5 mm or less, 1 mm or less, 0.9 mm or less, 0.8 mm or less, 0.75 mm or less, 0.5 mm or less, 0.2 mm or less, 0.1 mm or less, 50 microns or less, 30 microns or less, 20 microns or less, 10 microns or less, 5 microns or less, 2 microns or less, 1 micron or less, 500 nm or less, 400 nm or less, 200 nm or less, 150 nm or less, 100 nm or less, 75 nm or less, 50 nm or less, or 30 nm or less. In some embodiments, the particulate materials can have a median ($D_{50}$) particle size diameter of 1 nm or more, 5 nm or more, 10 nm or more, 20 nm or more, 50 nm or more, 75 nm or more, 100 nm or more, 250 nm or more, 500 nm or more, 1 micron or more, 2 microns or more, 5 microns or more, 10 microns or more, 50 microns or more, 100 microns or more, 500 microns or more, 1 mm or more, 1.5 mm or more, or 2 mm or more. In some examples, the particulate materials can have a median ($D_{50}$) particle size diameter of from 5 nm to 2 mm, from 10 nm to 500 microns, or from 10 nm to 50 microns. The particulate materials can have a particle size distribution, wherein at least 90% by weight of the particles ($D_{90}$) have a diameter of 2 mm or less (for example, 1.5 mm or less, 1 mm or less, 0.5 mm or less, 0.1 mm or less, 50 microns or less, 10 microns or less, 5 microns or less, 1 micron or less, 500 nm or less, 250 nm or less, 100 nm or less, or 50 nm or less). In some embodiments, the particulate materials can have a particle size distribution, wherein at least 90% by weight of the particles ($D_{90}$) have a diameter of from 5 nm to 2 mm, from 10 nm to 500 microns, or from 10 nm to 50 microns.

In some embodiments, the cementitious compositions can include nanoparticle sized particulate materials that interact with the hydroxyl containing compound. The nanoparticles can have a median particle size diameter of from 1 nm to 1000 nm. For example, the nanoparticles can have a median particle size diameter of 1000 nm or less, 950 nm or less, 900 nm or less, 850 nm or less, 800 nm or less, 750 nm or less, 700 nm or less, 650 nm or less, 600 nm or less, 550 nm or less, 500 nm or less, 450 nm or less, 400 nm or less, 350 nm or less, 300 nm or less, 250 nm or less, 200 nm or less, 150 nm or less, 100 nm or less, 75 nm or less, 50 nm or less, or 30 nm or less. In some embodiments, the 300 nm or less, 250 nm or less, can have a median particle size diameter of 1 nm or more, 5 nm or more, 10 nm or more, 20 nm or more, 50 nm or more, 75 nm or more, 100 nm or more, 150 nm or more, 200 nm or more, 250 nm or more, 300 nm or more, 350 nm or more, 400 nm or more, 450 nm or more, 50 nm or more, or 550 nm or more. In some examples, the nanoparticles can have a median particle size diameter of from 5 nm to 1000 nm, from 10 nm to 900 nm, from 10 nm to 500 nm, from 10 nm to 400 nm, or from 50 to 500 nm.

In some embodiments, the cementitious compositions can include microparticle sized particulate materials that interact with the hydroxyl containing compound. The microparticles can have a median particle size diameter of from 1 micron to 1000 microns, such as from 1 micron to 500 microns, from 2 microns to 200 microns, from 5 microns to 50 microns, or from 2 microns to 10 microns.

Suitable examples of particulate materials that interact with the hydroxyl containing compound for including in the cementitious compositions can be any natural or synthetic particles. In some examples, the particulate materials can include inorganic particles. Suitable examples of inorganic particles for use in the cementitious compositions can include silica; sand; ground sand; silica fume; slate dust; crusher fines; red mud; amorphous carbon (e.g., carbon black); clays (e.g., kaolin including meta-kaolin); mica; talc; wollastonite; alumina; feldspar; bentonite; quartz; garnet; saponite; beidellite; granite; slag; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; expanded clay; expanded shale; expanded perlite; vermiculite; volcanic tuff; pumice; hollow ceramic spheres; hollow plastic spheres; expanded plastic beads (e.g., polystyrene beads); ground tire rubber; ash, ground/recycled glass (e.g., window or bottle glass); milled glass; glass spheres; glass flakes; fibers; calcium carbonate; aluminum trihydrate (ATH); a polymeric material; and mixtures thereof. In some examples, the particulate materials can include fibers. The fibers can include glass fibers, basalt fibers, alumina silica fibers, aluminum oxide fibers, silica fibers, carbon fibers, metal fibers, metal and metal-coated fibers, and mineral fibers (such as stone wool, slag wool, or ceramic fiber wool).

The particulate materials that interact with the hydroxyl containing compound can be present in the cementitious compositions in amounts from 0.1% to 95% by weight of the cementitious composition. For example, the particulate material can be present in the cementitious composition in an amount of 0.1 wt % or greater, 0.2 wt % or greater, 0.5 wt % or greater, 1 wt % or greater, 1.5 wt % or greater, 2 wt % or greater, 5 wt % or greater, 10 wt % or greater, 15 wt % or greater, 20 wt % or greater, 30 wt % or greater, 50 wt % or greater, 60 wt % or greater, 75 wt % or greater, or 80 wt % or greater, based on the total weight of the cementitious material and the hydroxyl containing compound. In some embodiments, the particulate material can be present in an amount of 95 wt % or less, 90 wt % or less, 85 wt % or less, 80 wt % or less, 75 wt % or less, 50 wt % or less, 45 wt % or less, 30 wt % or less, 25 wt % or less, 20 wt % or less, 15 wt % or less, or 10 wt % or less, based on the total weight of the cementitious material and the hydroxyl containing compound. In some embodiments, the particulate material can be present in an amount of from 0.1 wt % to 95 wt %, from 0.1 wt % to 50 wt %, from 0.1 wt % to 25 wt %, or from 0.5 to 30 wt %, based on the total weight of the cementitious material and the hydroxyl containing compound.

In embodiments where the cementitious compositions include nanoparticle sized particulate materials, the nanoparticle particulate materials can be present in the cementitious compositions in an amount from 0.1% to 30% by weight. For examples, the amount of nanoparticles present in the cementitious compositions can be 0.1% or greater, 0.2% or greater, 0.3% or greater, 0.5% or greater, 1% or greater, 2% or greater, 2.5% or greater, 3% or greater, 4% or greater, 5% or greater, or 10% or greater, by weight. In some embodiments, the nanoparticles can be present in an amount of 30 wt % or less, 25 wt % or less, 20 wt % or less, 15 wt % or less, 10 wt % or less, 5 wt % or less, 4 wt % or less, 3 wt % or less, 2 wt % or less, 1.5 wt % or less, or 1 wt % or less, based on the total weight of the cementitious material and the hydroxyl containing compound. In some embodiments, the nanoparticles can be present in amounts from 0.1% to 20% by weight such as from 0.4% to 10% by weight, from 0.2% to 5% by weight, or from 0.2% to 3% by weight, based on the total weight of the cementitious material and the hydroxyl containing compound. In some embodiments, the nanoparticles can include a blend such as nanosilica.

In embodiments where the cementitious compositions include microparticle sized particulate materials (such as metakaolin), the microparticle particulate material can be present in the cementitious compositions in an amount from 5% to 35% by weight. For examples, the amount of microparticles present in the cementitious compositions can be 5% or greater, 8% or greater, 10% or greater, 15% or greater, 20% or greater, 25% or greater, or 30% or greater, by weight. In some embodiments, the microparticles can be present in an amount of 35 wt % or less, 30 wt % or less, 25 wt % or less, 20 wt % or less, 15 wt % or less, 10 wt % or less, or 5 wt % or less, based on the total weight of the cementitious material and the hydroxyl containing compound. In some embodiments, the microparticles can be present in amounts from 5% to 30% by weight such as from 5% to 25% by weight, or from 5% to 20% by weight, based on the total weight of the cementitious material and the hydroxyl containing compound.

In some examples, the materials that interact with the hydroxyl containing compound can include a water soluble material. The water-soluble material can be a particulate material but dissolves during mixing of the cementitious composition and solidify upon curing of the cementitious mixture. Suitable examples of water-soluble materials include, for example, halogen compounds, oxides, silicates, hydroxides, sulfates, carbonates or phosphates of sodium, potassium, calcium, magnesium or iron. In some examples, the material can include a water soluble silicate containing material such as a sodium silicate salt. The water soluble material can be present in an amount of 5% by weight or less (for example, 4% by weight or less 3% by weight or less, from 0.1% to 5% by weight, from 0.2% to 3% by weight), based on the total weight of the cementitious material and the hydroxyl containing compound.

As described herein, the hydroxyl containing compound can interact with the particulate material and/or the water soluble material. In some embodiments, at least a portion of the hydroxyl containing compounds interact with the particulate material and/or water soluble material. For example, the hydroxyl containing compound can interact with the nanoparticles, microparticles, or water-soluble materials through covalent, non-covalent, and/or ionic interactions. In certain embodiments, the hydroxyl containing compound can adhere/adsorb via non-covalent interactions to a surface of the particulate material (including nanoparticles, microparticles) or water-soluble materials present in the compositions. In specific examples, the cementitious compositions can include a particulate material that interacts with the hydroxyl containing compound selected from silica, clay, fibers, calcium silicate hydrate, calcium aluminate, magnesium oxide, lime, wollastonite, a water soluble silicate salt, or mixtures thereof.

The cementitious compositions can also include an aggregate. The aggregate can be of varying sizes as would be understood by those of skill in the art. Any aggregate that is traditionally employed in the production of cementitious compositions such as concrete compositions can be used, including dense-graded aggregate, gap-graded aggregate, open-graded aggregate, and mixtures thereof. Dense-graded aggregate exhibits the greatest surface area (per unit of aggregate). Open-graded aggregate largely consists of a single, large-sized (e.g., around 0.375 inch to 1.0 inch) stone with very low levels (e.g., less than about two percent of the total aggregate) of fines (e.g., material less than 0.25 inch) or filler (e.g., mineral material less than 0.075 mm). Gap graded aggregate fall between dense-graded and open-graded classes.

The compositions disclosed herein can include aggregates and other admixtures, as needed depending on the particular application. Aggregates and other admixtures can be added as fillers or to compositions, such as concrete to modify or influence the hardened compositions, such as the workability or compressive strength. Some examples of aggregates are sand, gravel, or crushed stone. Admixtures may be added to concrete mixtures for example, to improve stability or to ensure the quality of concrete during mixing, transporting, placing, and curing. Some examples of admixtures include surfactants, crosslinkers, UV stabilizers, fire retardants, antimicrobials, anti-oxidants, and pigments. Examples of UV light stabilizers include hindered amine type stabilizers and opaque pigments like carbon black powder. Fire retardants can be included to increase the flame or fire resistance of the compositions. Antimicrobials can be used to limit the growth of mildew and other organisms on the surface of the compositions. Antioxidants, such as phenolic antioxidants, can also be added. Antioxidants provide increased UV protection, as well as thermal oxidation protection. Pigments or dyes such as iron oxide can optionally be added to the compositions described herein.

The cementitious compositions described herein can be used in concrete. Accordingly, concrete compositions comprising the cementitious compositions are disclosed. Concrete is most commonly formed from Portland cement and the concrete is typically manufactured in a ready-mix plant. Typically, hydration of Portland cement is accelerated using accelerators such as calcium chloride, sodium silicate, sodium aluminate or aluminium sulphate, or by increasing the fineness of grind of the parent cement. In some cases, the concrete can include a hydroxyl containing compound, a microparticle or nanoparticle particulate material as described herein, and Portland cement and optionally a supplementary cementing material including slaked lime, fly ash, metakaolin, cement kiln dust, blended ordinary Portland cement, ground granulated blast-furnace slag, limestone fines, or any combination thereof.

Methods

Methods of preparing the cementitious compositions are also disclosed. In some embodiments, the method can include mixing a cementitious material, a hydroxyl containing compound, a particulate material and/or water soluble material that interacts with the hydroxyl containing compound, and water. The materials can be added in any suitable order. For example, in some embodiments, the mixing stage of the method used to prepare the cementitious compositions can include: (1) mixing the cementitious material, the hydroxyl containing compound, and the particulate material and/or water soluble material; (2) mixing water with the cementitious material, the hydroxyl containing compound, and the particulate material and/or water soluble material; and (3) allowing the cementitious mixture to cure. The particulate material and/or water soluble material that interacts with the hydroxyl containing compound can be added at the same time as the hydroxyl containing compound, or can be added prior to, during, or after stage (1) or (2).

Preferably however, the particulate material and/or water soluble material that interacts with the hydroxyl containing compound is mixed with the hydroxyl containing compound prior to stage (1). In some embodiments, the mixing stage of the method used to prepare the cementitious compositions can include: (1) mixing the hydroxyl containing compound, the particulate material (such as nanoparticles or microparticles) or water soluble material), and optionally water; (2) mixing the cementitious material with the hydroxyl containing compound, the particulate material or water soluble material, and optionally water; (3) optionally mixing water with the cementitious material, hydroxyl containing compound, and the particulate material or water soluble material; and (4) allowing the cementitious mixture to cure. As disclosed herein, the hydroxyl containing compound can react with the particulate material or water soluble material. The method of making the cementitious compositions disclosed herein can include pre-reacting the hydroxyl containing compound with the particulate material or water soluble material prior to mixing with the cementitious material.

In specific examples, the method of making the cementitious compositions can include mixing the hydroxyl containing compound and a particulate material that interacts with the hydroxyl containing compound to form a slurry having a pH value greater than 4 (such as greater than 5, greater than 6, or greater than 7), and blending the slurry with a hydraulic cementitious material to produce a cementitious mixture.

In other examples, the method of making the cementitious compositions can include mixing the hydroxyl containing compound and a water soluble material such as a water soluble silicate salt to form a suspension having a pH value greater than 4 (such as greater than 5, greater than 6, or greater than 7), and blending the suspension with a hydraulic cementitious material to produce a cementitious mixture. The water soluble silicate salt (such as sodium silicate) can be provided as an aqueous solution or mixture. In further examples, the method can include reacting the water soluble silicate salt with a calcium salt (such as calcium nitrate, calcium acetate, calcium chloride, or mixtures thereof) to form a calcium silicate hydride. The calcium silicate hydride can be formed prior to or during mixing with the hydroxyl containing compound.

The cementitious mixture can be blended in any suitable manner to obtain a homogeneous or heterogeneous blend of the cementitious material, hydroxyl containing compound, and the particulate material or water soluble material that interacts with the hydroxyl containing compound. In some embodiments, mixing can be conducted in a high speed mixer or an extruder. An ultrasonic device can be used for enhanced mixing and/or wetting of the various components of the compositions. The ultrasonic device produces an ultrasound of a certain frequency that can be varied during the mixing and/or extrusion process. The ultrasonic device useful in the preparation of compositions described herein can be attached to or adjacent to the extruder and/or mixer. For example, the ultrasonic device can be attached to a die or nozzle or to the port of the extruder or mixer. An ultrasonic device may provide de-aeration of undesired gas bubbles and better mixing for the other components, such as particulate materials.

The pH of the cementitious mixture is greater than 4 (for example, greater than 5, greater than 6, greater than 6.5, greater than 7, greater than 7.5, greater than 8, greater than 8.5, or greater than 9). In some embodiments, the pH of the cementitious mixture is from greater than 5 to 12, from 5.5 to 12, from 6 to 12, from 6.5 to 12, from 7 to 12, from greater than 7 to 12, from 7.5 to 11, or from 8 to 10.

The method of making the cementitious compositions can include allowing water, the cementitious material, the hydroxyl containing compound, and the particulate material or water soluble material to react (or cure) to form a cementitious composite. The composite can have a first surface and a second surface opposite the first surface. The curing stage of the method used to prepare the cementitious composite can be carried out in a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. In some embodiments, a molded article can then be formed prior to the additional method steps in forming the composites.

It is desirable that the cementitious compositions has a set-time below a particular threshold so it can be effectively processed. Without wishing to be bound by theory, it is believed that some hydroxyl containing compounds can retard the compressive strength, especially, the early compressive strength (such as after curing for 3 days or less) of cementitious compositions by its strong adhesion to surfaces through covalent and noncovalent interactions. The hydroxyl containing compounds can be adsorbed to cement particle and hence restrict the access of water to cement. In some embodiments, the cementitious compositions described herein do not exhibit a reduction in its early compressive strength. In specific embodiments, the cementitious compositions described herein have a similar or increased compressive strength after curing for 3 days compared to an otherwise identical cementitious compositions excluding the hydroxyl containing compound. For example, the cementitious compositions described herein have the same, greater than 0.5%, greater than 1%, or greater than 5% more compressive strength after curing for 3 days compared to an otherwise identical cementitious compositions excluding the hydroxyl containing compound. In some embodiments, the cementitious compositions described herein have the same, greater than 0.1 MPa, greater than 0.5 MPa, or greater than 1 MPa more compressive strength after curing for 3 days compared to an otherwise identical cementitious compositions excluding the hydroxyl containing compound. The compositions described herein exhibit initial and final set times within the acceptable limits specified by ASTM C94.

Incorporation of the hydroxyl containing compound and the particulate material or water soluble material that interacts with the hydroxyl containing compound into the cementitious compositions can lead to improvements in the final compressive strength of the cementitious compositions. The cementitious compositions comprising the hydroxyl containing compound and particulate material or water soluble material described herein have desirably increased compressive strength after curing for 28 days, compared to the compressive strength of an otherwise identical cementitious composition excluding the hydroxyl containing compound and the particulate material or water soluble material that interacts with the hydroxyl containing compound. In some embodiments, the cementitious compositions described herein have at least 5% more compressive strength after curing for 28 days compared to an otherwise identical cementitious compositions excluding the hydroxyl containing compound and the particulate material or water soluble material that interacts with the hydroxyl containing compound. For example, the cementitious compositions described herein have greater than 5%, greater than 10%, greater than 15%, greater than 20%, or greater than 25% more compressive strength after curing for 28 days compared to an otherwise identical cementitious compositions excluding the hydroxyl containing compound and the particulate material or water soluble material that interacts with the hydroxyl containing compound. In some embodiments, the cementitious compositions described herein have greater than 5 MPa, greater than 6 MPa, greater than 8 MPa, greater than 10 MPa, or greater than 15 MPa more compressive strength after curing for 28 days compared to an otherwise identical cementitious compositions excluding the hydroxyl containing compound and the particulate material or water soluble material that interacts with the hydroxyl containing compound.

In some embodiments, the compressive strength of the cementitious compositions described herein can be 60 MPa or greater, after curing for 28 days. For example, the compressive strength of the cementitious compositions described herein can be 62 MPa or greater, 65 MPa or greater, 70 MPa or greater, 75 MPa or greater, 80 MPa or greater, 85 MPa or greater, or 90 MPa or greater, after curing for 28 days. In some embodiments, the cementitious compositions can have a compressive strength of from 60 MPa to 100 MPa or from 60 MPa to 90 MPa, after curing for 28 days. The compressive strength can be determined by cylinder specimens as described in ASTM C39 or C39M-18 (2018.

As discussed herein, incorporation of the hydroxyl containing compounds and the particulate material or water soluble material into the cementitious composites can improve their compressive strength, compared to when the hydroxy containing compound and particulate material or water soluble material that interacts with the hydroxyl containing compound are excluded from the composite. The optimization of the compressive strength of the composites allows their use in building materials and other structural applications that is subject to typical or increased stress of the outdoor environment that surrounds it. For example, the composites can be formed into concrete or shaped articles and used in building materials. Suitable building materials include siding materials, building panels, sheets, architectural moldings, sound barriers, thermal barriers, insulation, wall boards, ceiling tiles, ceiling boards, soffits, roofing materials, and other shaped articles. Examples of shaped articles made using the composite panels described herein include roof tiles such as roof tile shingles, roof cover boards, slate panels, shake panels, cast molded products, moldings, sills, stone, masonry, brick products, posts, signs, guard rails, retaining walls, park benches, tables, slats, corner arches, columns, ceiling tiles, or railroad ties.

The cementitious compositions described herein can be used to inhibit corrosion of reinforcing steels embedded within the cementitious composition. Without wishing to be bound to theory, it is believed that the hydroxyl containing compound can react with iron, for example, in the steel and form a dense outer layer on a surface of the steel. The dense outer layer is resistant to corrosion. Methods for improving corrosion resistance of reinforcing steel bars embedded in concrete, comprising embedding the reinforcing steel bars in a cementitious composition as described herein are disclosed.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1: Bio-Inspired Renewable Admixtures for Concrete

Portland cement-based concrete (PCC) is one of the most widely used construction material in civil infrastructure system, accounting for about 70% of all building and construction materials. This example explores low-cost natural products, tannic acid (TA), as a new admixture to enhance both the mechanical properties and durability of Ordinary Portland Cement (OPC) based mortar/concrete. TA is a water solvable plant polyphenol, and is the world's third largest class of plant components after cellulose and lignin. It can be extracted from plants, microorganisms, or decomposing organic matters in water. One unique feature for these biomolecules is their capability to strongly bind to diverse surfaces through covalent and non-covalent interactions. Recent studies have established that TA can be used to improve the performance of various materials (B. Horev, et al., *ACS Nano* 2015, 9, 2390-2404; P. F. Forooshani, et al., *Journal of Polymer Science. Part A: Polymer Chemistry* 2017, 55, 9-33; H. J. Kim, et al., *J. Membr. Sci.* 2016, 514, 25-34; Y. Guan, et al., *RSC Adv.* 2016, 6, 69966-69972; and S. Yang, et al., *Composites Science and Technology* 153 (2017), 40-47) through a number of mechanisms.

Concrete comprising ordinary Portland cement as the binder is one of the most widely used construction material. Although ordinary Portland cement has many advantages such as ease of application and availability of raw materials around the world, the production of ordinary Portland cement releases a large amount of greenhouse gases. To combat global climate change, the carbon footprint of ordinary Portland cement-based concrete should be reduced. This can be achieved through enhancing the performance of concrete so that less ordinary Portland cement is needed in concrete or longer service-life of concrete can be reached.

Concrete comprises granular aggregates and cement paste which bonds the aggregates together. Usually, the aggregates possess better mechanical properties and durability than the cement paste, which has an agglomerate structure of calcium silicate hydrates (CSH) and calcium hydroxide (CH) bound together by weak van der Waals forces. The properties of the concrete can be improved through enhancing the cement paste with another bonding material, such as many polymeric additives (M. Heidari-Rarania, et al. *Constr. Build. Mater.* 64 (2014) 308-315; K.-S. Yeon, et al. *Constr. Build. Mater.* 63 (2014) 125-131; and D. Bortzmeyer, et al., *J. Mater. Sci.* 30 (1995) 4138-4144), which have been extensively studied over last few decades. However, these polymeric additives are based on petroleum, which are not only nonrenewable and environmentally unfriendly, but also adds considerable cost to the concrete.

Daily life observation shows that tea and wine always leave stain on the glassware. The pot used to prepare tea gradually darkens in color, which is persistent and hard to remove. This interesting feature of tea suggests that some compound in tea has strong bonding ability. The material responsible for the tea staining and tanning has been identified as TA (T. S. Sileika, et al. *Angew. Chem. Int. Ed.* 2013, 52, 10766-10770; and S. Quideau, et al. *Chem. Int. Ed.* 2011, 50, 586-621), which is abundant phenolic dendroid and can be found in wine, tea, coffee, chocolate, tree leaves and barks, and fruits.

The commercially available tannic acid is a plant polyphenol usually can be written as $C_{76}H_{52}O_{46}$ with a chemical structure shown in (FIG. 1). It has a center glucose molecule and five hydroxyl moieties esterified with two gallic acid (3,4,5-trihydroxybenzoic acid) molecules. With abundant reactive terminal phenolic hydroxyl groups, tannic acid has ability to complex or cross-link macromolecules at multi-binding sites through multiple interactions, including hydrogen and ionic bonding and hydrophobic interactions (F. H. Heijmen, et al., *Biomaterials* 1997, 18, 749-754; T. Shutava, et al.; *Macromolecules* 2005, 38, 2850-2858; and I. Erel-Unal, et al., *Macromolecules* 2008, 41, 3962-3970).

Recent interest in tannic acid is also inspired by mussels, which display an extraordinary ability to adhere to substrates under water (J. Guo, et al., *Angew. Chem. Int. Ed.* 2014, 53, 5546-5551) using adhesive proteins (J. H. Waite, *Chemtech.*, 1987, 17, 692-697) L-3,4-dihydroxyphenylalanine (DOPA) in the mussel byssus. Waite and Tanzer (J. H. Waite, et al. *Science* 1981; 212:1038-40) found that catechols of the DOPA are responsible for the versatile adhesion of mussels.

Studies have also been carried out to exploit catechols as binding agent in synthetic materials (E. Faure, et al. *Progress in Polymer Science* 38, 236-270; H. J. Cha, et al., *Biotechnology Journal* 2008; 3:631; J. H. Waite, et al., *Science.* 1981; 212:1038; and J. J. Wilker, et al., *Angewandte Chemie International Edition.* 2010; 49:8076). Tannic acid also has high catechol content, and therefore, possess similar ability as DOPA to strongly adhere to surfaces through covalent and noncovalent interactions (H. Lee, et al., *Proc. Natl. Acad. Sci. USA* 2006, 103, 12999-13003). Compared with DOPA and its simplified mimic, dopamine, tannic acid is much cheaper and more abundant. For this reason, the past few years has witnessed applications of tannic acid in various materials, such as adsorption and antibacterial materials, nano-/micro-particles, capsules, films/coatings, bioadhesive, hydrogels, and nanocomposites (Dierendonck, M. et al., *Adv. Funct. Mater.* 2014, 24, 4634-4644; C. Yang, et al., *ACS Appl. Mater. Interfaces* 2015, 7, 9178-9184; H. Ejima, et al., *Science* 2013, 341, 154-157; X. Zhang, et al., *ACS Appl. Mater. Interfaces* 2016, 8, 32512-32519; and H. Fan, et al., *Macromolecules* 2017, 50, 666-676).

In this example, three salient features of tannic acid have been exploited to enhance the perforce of concrete.

1) tannic acid can form intermolecular networks cross-linked by hydrogen bonding with a variety of polymers, such as PEG, poly(N-vinylpyrrolidone), poly(N-isopropylacrylamide], poly(N-vinylpyrrolidone) (K. C. Yen et al., *Polym. Bull.* 2009, 62, 225-235; M. Dierendonck, et al., *Adv. Funct. Mater.* 2014, 24, 4634-4644; E. Costa, et al., *Macromolecules,* 2011, 44, 612-621; and V. Kozlovskaya, et al., *Soft Matter,* 2011, 7, 2364-2372). Guan et al. (*RSC Adv.* 2016, 6, 69966-69972), for example, enhanced the tensile strength and toughness a PVA composite film by 46% and 27%, respectively. Yang et al. (*Composites Science and Technology* 153 (2017), 40-47) used tannic acid as a self-reinforcing organic filler to prepare nitrile-butadiene rubber/tannic acid (NBR/T) composites. It is believed that tannic acid can be added into concrete to generate a larger number of strength-generating bonds, significantly improving the performance of the concrete.

2) tannic acid has ability to capture calcium ions and induce local mineralization, as demonstrated in a recent study by Oh et al. (*Scientific Reports* 2015, 5:10884). Oh et al. immersed tooth slices without and with tannic acid coating in artificial saliva for 7 days to allow hydroxyapatite (HA) to grow on the dentinal tubules. Oh et al. found that no HA was produced on the dentinal tubule of the uncoated tooth slice, while a lot of needle-like HA minerals can be found on the tubule of tannic acid coated tooth slice. This is because the pyrogallol group of tannic acid can bind calcium ions in aqueous environments (S. C. Tam, et al. *J. Environ. Qual.* 19, 514-520 (1990)), which facilitates a local supersaturation of $Ca^{2+}$ to induce faster localized mineralization of HA. Hydration of OPC is nothing but a mineralization process of calcium-contained hydration products such as CSH and CH. It is speculated that tannic acid can facilitate the hydration of OPC in the similar fashion as it does on the mineralization of HA shown in FIG. 2.

Figure 2:
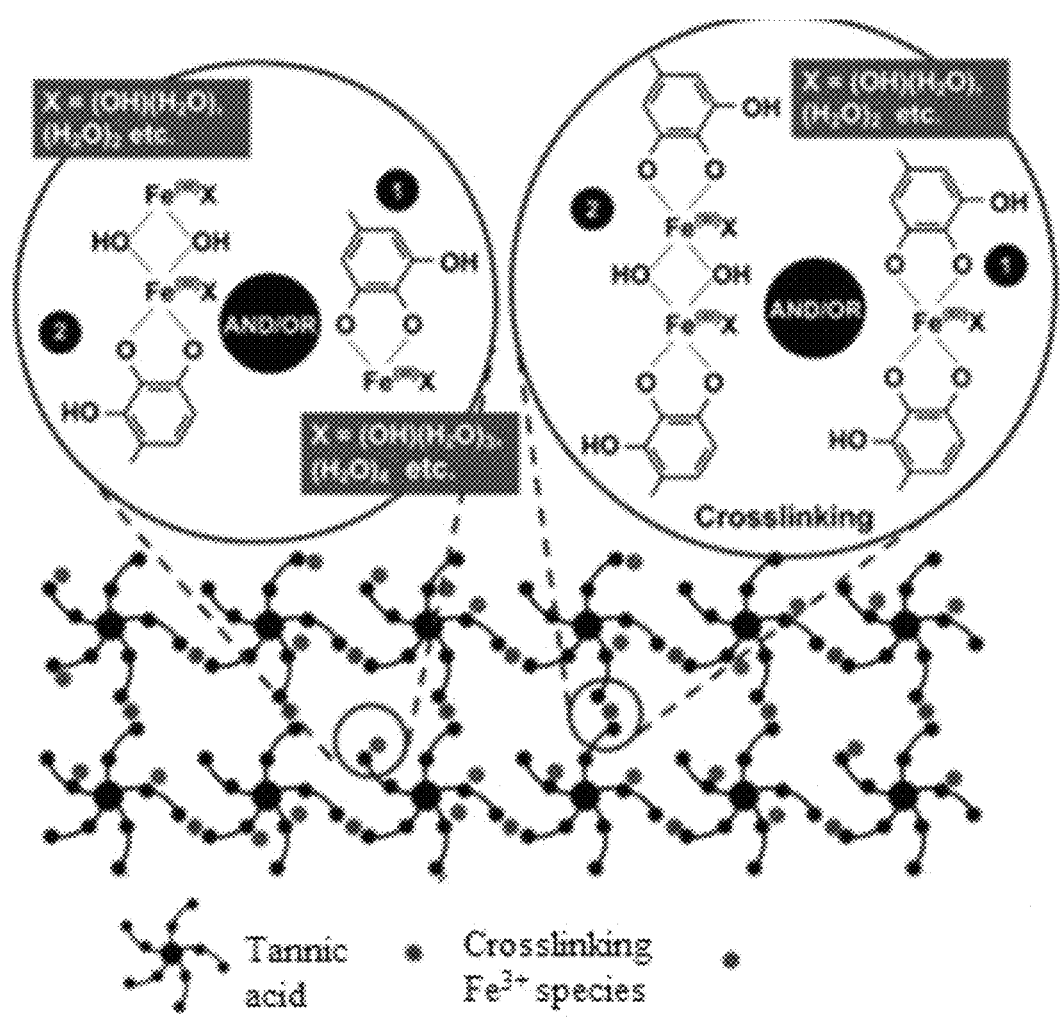
FIG. 2 is a diagram showing metal-phenolic networks by coordination of tannic acid and Iron (III), $Fe^{3+}$.

3) tannic acid can coordinate with metal ions to form TA-metal networks (H. Ejima, et al. *Science* 2013, 341, 154-157 and T. J. Deming, et al., *Curr Opin Chem Biol* 3 (1) (1999) 100-105). TA is coordinated to 18 different metal ions, including aluminum and iron (J. Guo, et al., *Angew. Chem., Int. Ed.* 2014, 53, 5546-5551). Its adjacent hydroxyl groups provide chelating sites for $Al^{3+}$ or $Fe^{3+}$ ions. Together with the efficient coordination-driven cross-linking facilitated by the large number of gallol groups, a three dimensionally stabilized metal-phenolic networks (MPNs) can be produced, as shown in FIG. 2. Since both $Al^{3+}$ and $Fe^{3+}$ are present in OPC in tricalcium aluminate (C3A) and tetracalcium aluminoferrite (C4AF), it is anticipated that MPNs can be formed in concrete, strengthening the concrete. More importantly, tannic acid can react with steel to form a crazed layer of ferric tannates, which serves as an electrical insulator to inhibit the corrosion of the steel (M. Dierendonck, et al. and E. Costa, et al.).

The inherent abilities of TA outlined above, the low-cost, renewable, and non-toxic nature of TA, TA provides an environmentally friendly solution to enhance the performance of OPC based concrete.

Figure 3:
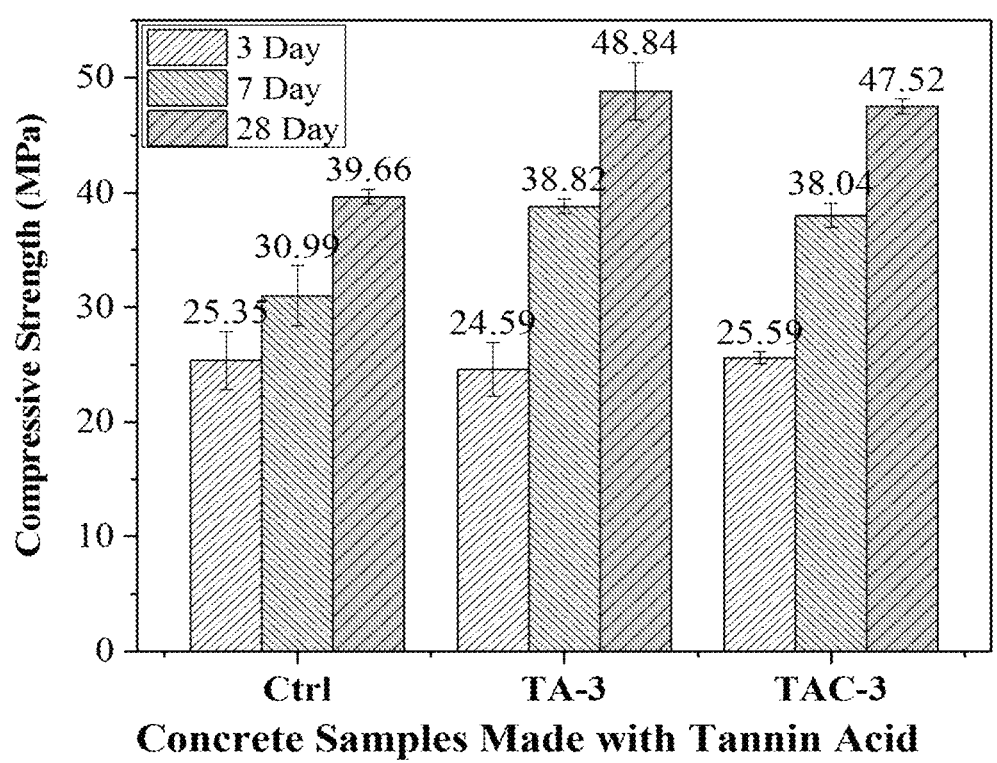
FIG. 3 is a bar graph showing the compressive strength of concrete samples comprising tannic acid.

Experimental: concrete cylinder specimens (4"x8") were made as control group according to ASTM C192 (ASTM C192/C192M-16a Standard Practice for Making and Curing Concrete Test Specimens in the Laboratory, 2016,) using SAKRETE™ type I/II Portland cement, water, and standard graded fine and coarse aggregate at mass ratio of 193:362: 842:1022. Based on Bogue calculation (ASTM C150, Standard Specification for Portland Cement, 2007), this cement has 53% C3S, 25.7% C2S, 8.6% C3A, and 7.8% C4AF. The fine aggregates were river sand with bulk specific gravity of 2.70 and water absorption capacity of 0.95%. The coarse aggregates were crushed limestone with dry specific gravity of 2.74 and water absorption capacity of 0.7%. Another two group of samples were made with the same mix as the control group but adding tannic acid at 0.1% and 0.3% (in weight) of the cement, respectively. The compressive strengths of these samples were measured after standard curing of 3 days, 7 days and 28 days, respectively, as shown in FIG. 3. In this figure, TA-1 and TA-3 refers to the concrete samples with 0.1% and 0.3% of TA (tannic acid), respectively. Adding 0.1% TA slightly increases the compressive strength of the concrete at all ages in comparison with the control group. Increasing the TA content to 0.3% of the cement reduces the compressive strength of the sample at 3 days, but improves the compressive strength at 7 and 28 day by 25% and 23%, respectively. However, such a significant increase on compressive strength achieved by just adding 0.3% TA challenges the common belief, which states that adding TA in mixing water reduces the compressive strength of the concrete, as shown in S. H. Kosmatk, et al. (Design and Control of Concrete Mixtures, EB001, 15$^{th}$ Ed, Portland Cement Association, 2011, 460 pages).

The discrepancy between the results in this example and Kosmatk et al. is believed to be due to the dose of TA added into the mixing water. The retarding effect of the TA can be alleviated by reducing its dose. For example, reducing the dose of TA to 0.3%, the retarding effect of the TA only slightly reduces the compressive strength of the concrete at 3 days as shown in FIG. 3. Further reducing the dose of the TA to 0.1%, no retarding effect on the strength developed can be observed from FIG. 3.

Figure 4A:
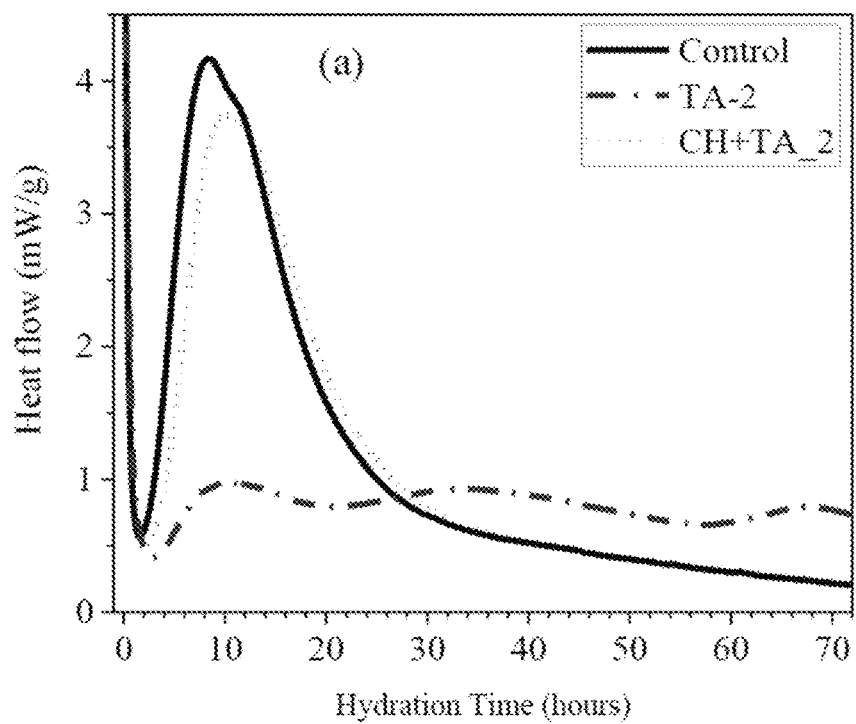
FIGS. 4A-4B are line graphs showing the heat flow (FIG. 4A) and heat evolution (FIG. 4B) of mortar samples after 72 hours of mixing with tannic acid.
Figure 4B:
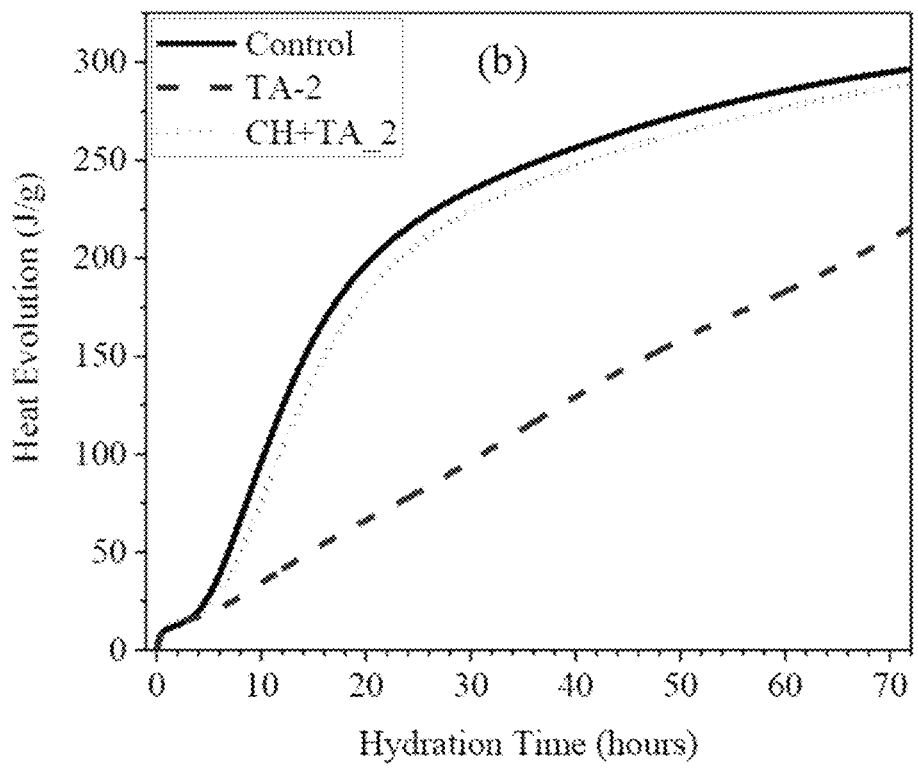

The retarding effect of TA is also revealed by the set times of the concrete without TA and the one with 0.3% TA shown in Table 1. The initial and final set times of the concrete were extended from 144 min. and 200 min. to 270 min. and 565 min., respectively, exceeding the acceptable limits specified by ASTM C94 (ASTM C94/C94M-16b Standard Specification for Ready-Mixed Concrete, 2016). Isothermal calorimetry test based on ASTM C1679 (ASTM C1679-17 Standard Practice for Measuring Hydration Kinetics of Hydraulic Cementitious Mixtures Using Isothermal Calorimetry, P A, 2017) and ASTM C1702 (ASTM C1702-17 Standard Test Method for Measurement of Heat of Hydration of Hydraulic Cementitious Materials Using Isothermal Conduction Calorimetry, P A, 2017) was carried out on two cement pastes with water to cement ratio of 0.4 to further examine the retarding effect of TA. The control shown in FIGS. 4A-4B refers to the paste without adding TA and the TA-2 group refers to the paste with 0.2% TA. As shown in FIG. 4A, two peaks which are induced by the hydration of tricalcium silicate (C3S) and tricalcium aluminate (C3A) can be clearly identified on heat flow of the control sample. After adding 0.2% of TA, these two peaks were delayed and drastically reduced, as shown in FIG. 4A, confirming the significant retarding effect of TA on the hydration of the cement at the early age. FIG. 4B shows that the total heat released from the paste with 0.2% TA only reaches ⅔ of that released from the control group at 72 h.

TABLE 1

The set time of the paste with different amounts of TA and Ca(OH)$_2$.

|  | Control | TA-3 | TAC-3 |
| --- | --- | --- | --- |
| TA Dose | 0 | 0.3 wt. % | 0.3 wt. % |
| Ca(OH)$_2$ (g) | 0 | 0 | 0.075 |
| Initial (min) | 144 | 270 | 190 |
| Final (min) | 200 | 565 | 290 |

The strong retarding effect of the TA is believed to be induced by its strong adhesion to surfaces through covalent and noncovalent interactions. It can be adsorbed to cement particle and hence restricts the access of water to cement. This retarding effect can be alleviated or eliminated if TA is adsorbed on small particles before being added into the mix of the concrete. To verify this idea, a small amount of calcium hydroxide (CH) powder was added into the mixing water before mixing with 0.2% TA (in weight of cement) so that TA can be adsorbed onto CH powders. The produced CH coated with TA suspension was then mixed with the cement to produce cement paste with the same water to cement ratio of those pastes tested in FIG. 3. The calorimetry testing result of this paste is shown in FIG. 4 and referred to as CH+TA_2. The retarding effect of the TA is almost eliminated by this method as revealed by this figure. Two peaks corresponding to the hydration of C3S and C3A were only slightly delayed and the total hydration heat of the paste reaches more than 90% of the control one during the measuring period. The effectiveness of this method to mitigate the retarding effect of the TA can be further verified by the set time of the concrete made with TA first adsorbed to CH, as shown in Table 1. In this table, the group TAC_3 was made in the same way as the TA-3 group except that the TA was adsorbed to CH by adding 1% (of cement) CH to the TA solution before being mixed with other ingredients of the concrete. As a result, the initial and final set times were reduced to 190 min. and 290 min., respectively, which are acceptable according to ASTM C94. More interestingly, this method of alleviating the retarding effect of the TA appears to have no significant effect on the strength improvement induced by the TA, as shown in FIG. 3. The compressive strength of the TAC-3 group at 3 days is slightly higher than that of the TA-3 because of the reduced retarding effect of TA after adsorbed to CH particles.

In summary, this example confirms significant enhancement on the mechanical properties of concrete can be achieved by adding small amount of TA as additive. The retarding effect of the TA can be alleviated or eliminated by adsorbing TA to small particles before added into the concrete mix.

Without wishing to be bound by theory, it is believed that the mechanisms responsible for the enhancement induced by the TA, may be due to TA initiating local mineralization and anchoring the hydration products. As a polyphenol, TA is known to strongly bind to diverse surfaces through covalent and non-covalent interactions. As demonstrated in this example, TA can be either directly added or first adsorbed to some particles and then added into the concrete. In both cases, TA is deposited on some surfaces which can be the surface of the un-hydrated cement particles, or the surface of hydrates, or aggregates. The pyrogallol groups of TA can strongly capture calcium ions released from the cement particles, creating a local supersaturation of $Ca^{2+}$, initiating precipitation of hydration products such as CSH and CH on this surface. In this way, TA turns an arbitrary surface in concrete into nucleating sites for hydration products, facilitating the hydration of the OPC. More importantly, these hydration products are firmly anchored to the surface by the TA due to its strong binding ability, leading to higher mechanical strength.

Figure 5A:
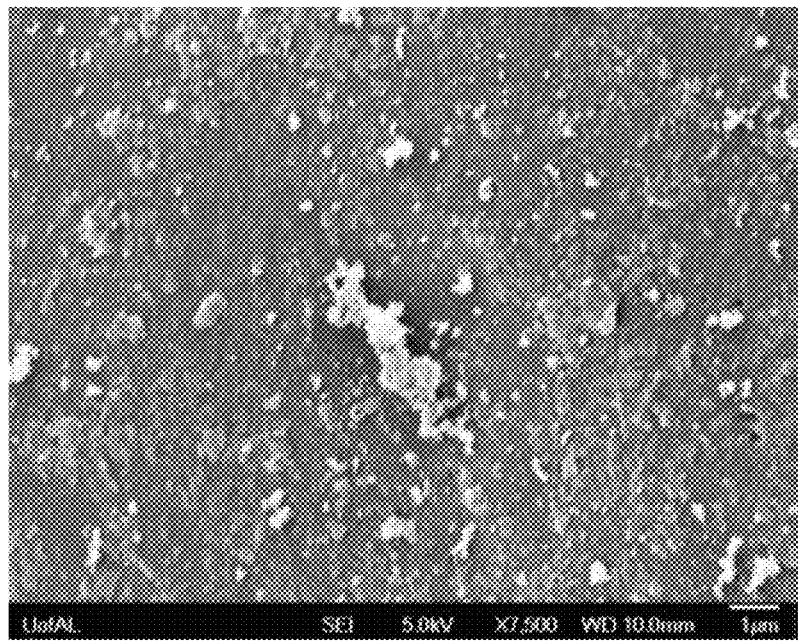
FIGS. 5A-5B are images showing the effect of tannic acid on the deposition of hydration products on sand.
Figure 5B:
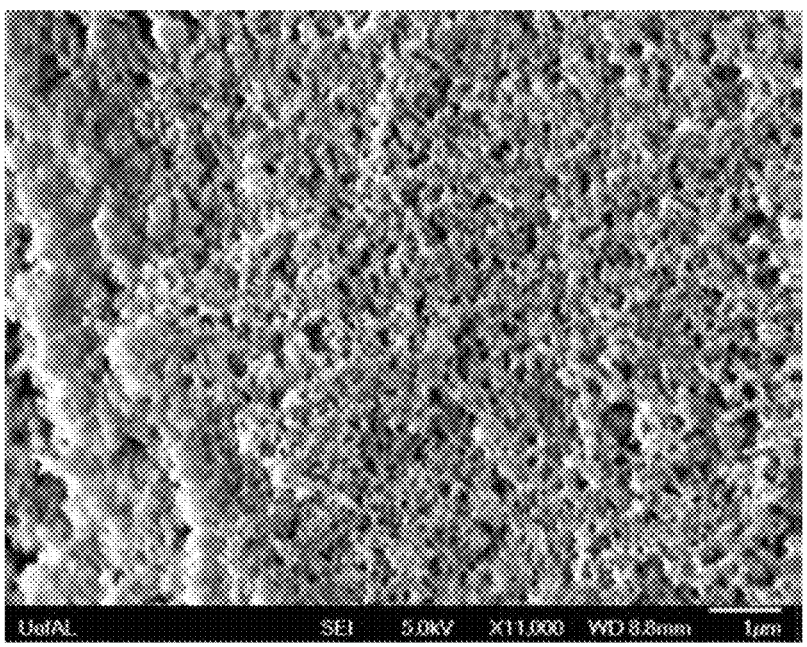

To provide preliminary support to this hypothesis, two quartz sand samples were prepared, a control sample without soaking in 1% TA solution and a treated sample produced by soaking in the 1% TA solution for 6 h. These two sand samples were immersed into a solution of 0.05 mol/L $(CH_3COO)_2Ca$ and 10 g $Na_2SiO_3$-$9H_2O$ for 24 h to allow for the deposition of CSH on them. SEM image shows that very little precipitate was deposited on the surface of the control sample, as shown in FIG. 5A. While a uniform layer of precipitate was produced on the surface of the sand treated by soaking in TA solution, as shown in FIG. 5B. The sharp difference between these two sand samples is clearly attributed to the ability of TA to capture calcium, which induces CSH to precipitate on the surface of the sand.

Figure 6A:
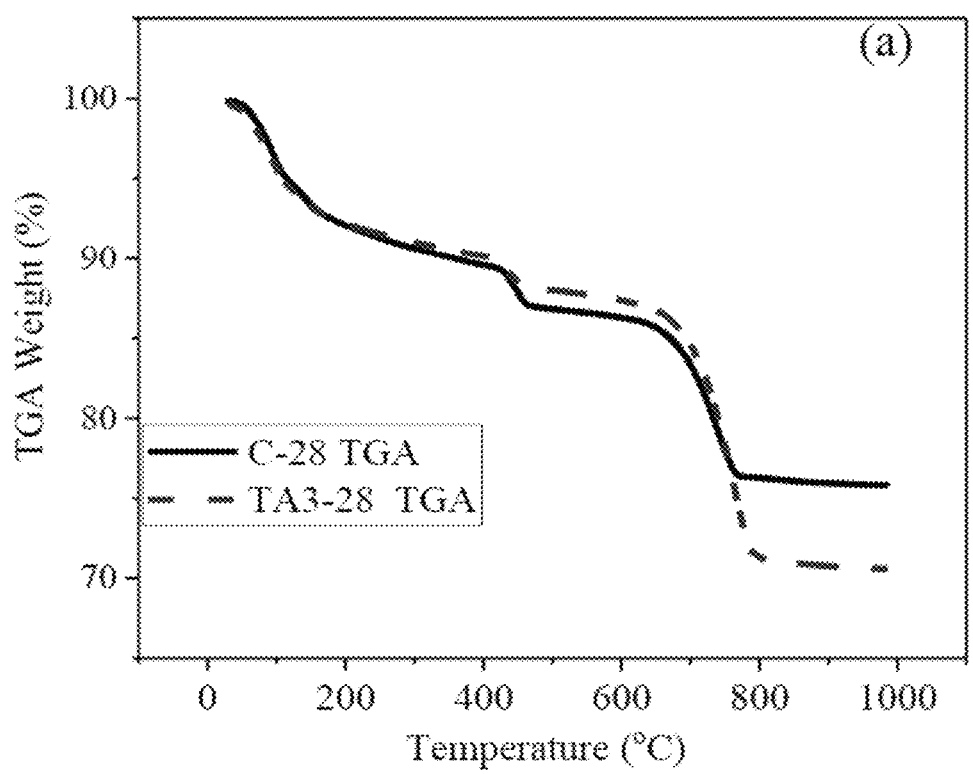
FIGS. 6A-6B are line graphs showing thermogravimetric analysis (TGA.
Figure 6B:
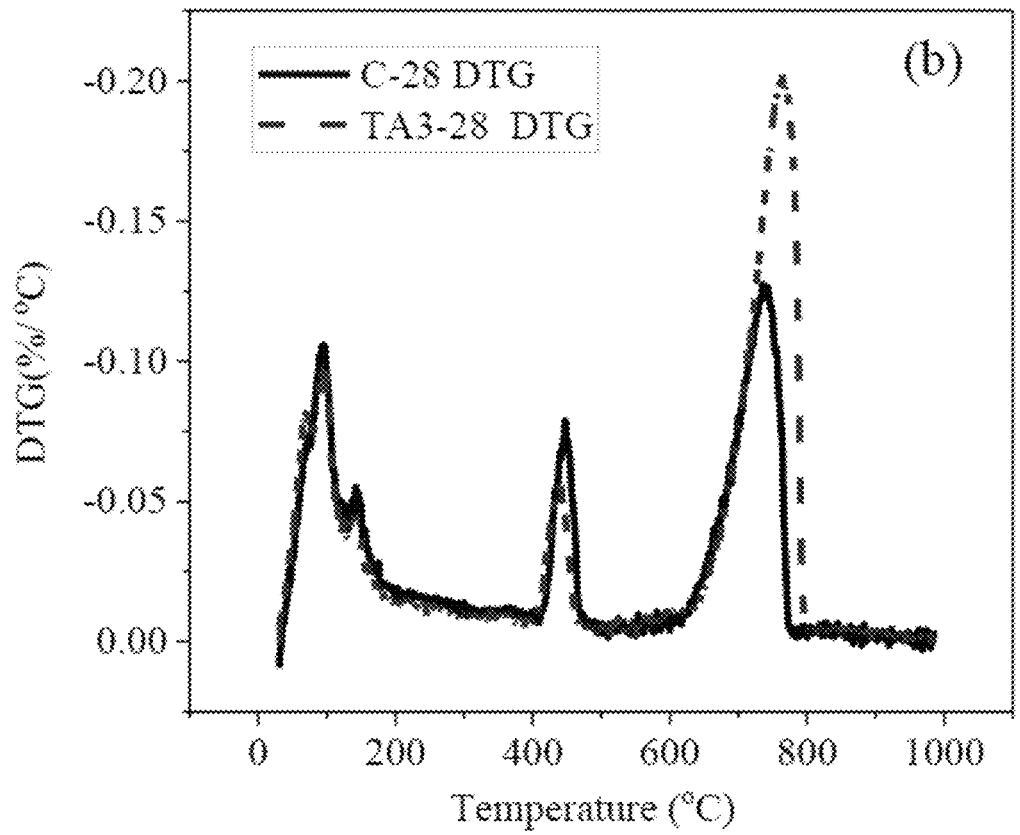

Thermogravimetric analysis (TGA) on two concrete samples tested in FIG. 3 was conducted and results are shown in FIGS. 6A-6B. In this figure, the C-28 groups refers to the control concrete sample without using TA at 28 days and the TA3-28 refers to the one with 0.3% of TA at 28 days. Four main peaks appear on the derivative mass loss (DTG) graph of these two samples FIG. 6B, corresponding to the decomposition of ettringite, CH and calcite, respectively.

The typical decomposition temperature ranges for ettringite, AFm, CH and calcium carbonate are 80° C.-130° C., 180° C.-200° C., 400° C.-500° C., and 680° C.-780° C., respectively. Adding TA doesn't increase the amount of CH in the concrete specimen, but significantly increases the amount of calcium carbonate in the concrete, as shown in FIG. 6B. The calcium carbonate present in both concrete samples were very likely resulted from the carbonation of CH in the air. It was noticed that both samples were ground and dried in open air. If this is the case, the total CH produced in the sample with TA will be higher than that produced in the control sample, suggesting that TA can promote hydration of the cement due to the seeding effect of TA.

Without also wishing to be bound by theory, it is believed that the mechanisms responsible for the enhancement induced by the TA, may be due to strengthening hardened paste through TA-metal chelation. Metal chelation is a common feature for many polyphenols. TA possesses many galloyl groups which provide binding sites for metal ions to chelate. After adding into concrete, TA can form TA-metal linkage with $Al^{3+}$ and $Fe^{3+}$ ions released from $C_3A$ and $C_4AF$ in OPC. This linkage can exist between any solid particles in the concrete, providing bonding force in addition to the van der Waals force between the hydration products.

A three dimensionally metal-phenolic networks can also be possibly produced in the concrete by TA.

The above strengthening mechanism obtained by TA-metal chelation is also adopted by living organisms to achieve a number of desirable material properties, such as increased toughness, self-repair, adhesion, high hardness in the absence of mineralization, and mechanical tunability. For example, although the cuticles of marine mussels is largely proteinaceous, it is approximately five times harder than the thread core. A recent study discovered that the catechoto-iron chelate complexes crosslinking protein granules are responsible for this high hardness of the cuticles. This biologically inspired strengthening strategy through metal complexation crosslinking has also been successfully used to tune both the strength and toughness of spider silks.

With large amount of phenolic hydroxyl groups, TA can also form a large number of hydrogen bonds within concrete, which significantly improve the performance of the concrete. As a result, the mechanical properties of the concrete can be greatly improved.

Without further wishing to be bound by theory, it is believed that the mechanisms responsible for the enhancement induced by the TA, may be due to densifying the microstructure of the hardened concrete. As mentioned above, TA converts various surface into nucleation sites for the precipitation of CSH and CH out of the pore solution, filling the gap between cement particles. As a result, capillary porosity of the mortar is reduced, leading to a denser microstructure and higher compressive strength. Without the nucleating effect of TA, larger capillary porosity will be formed.

Example 2: TA Used Together with Metakaolin TA

Figure 7:
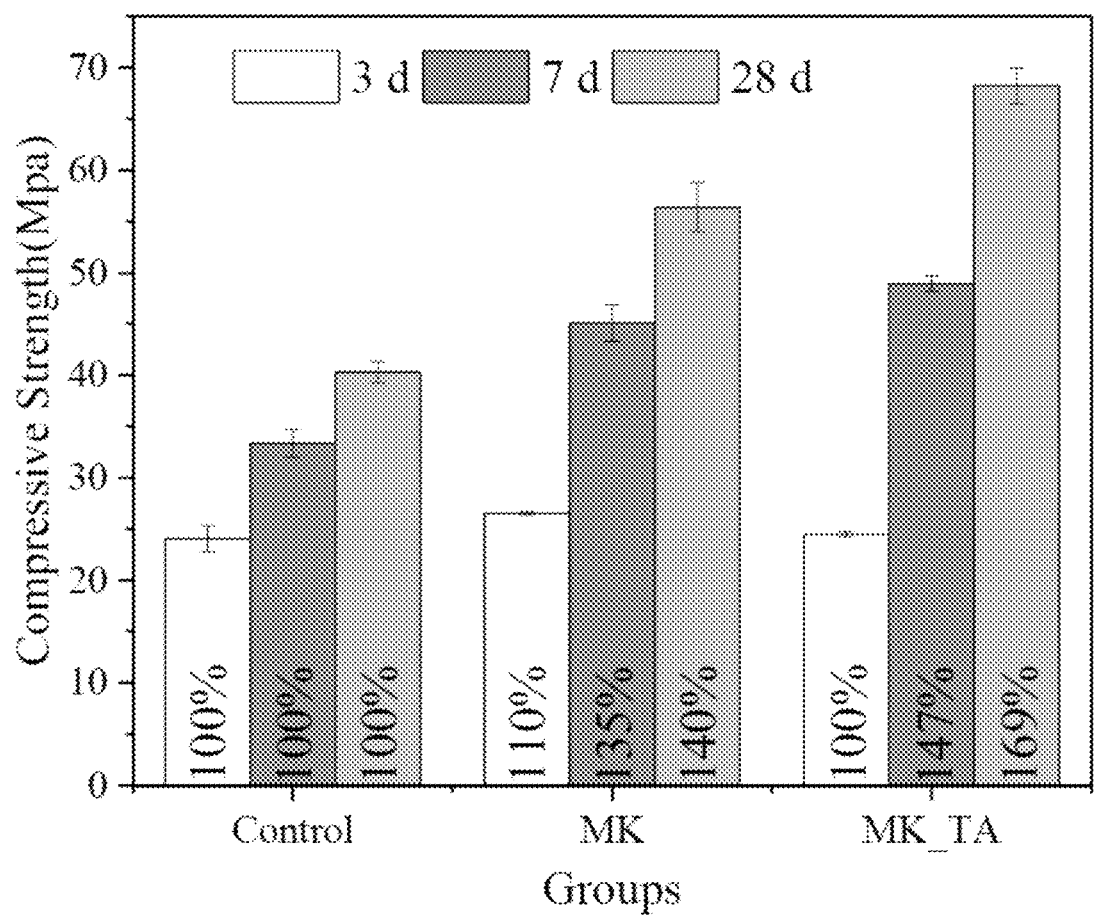
FIG. 7 is a bar graph showing the compressive strength of mortar samples comprising tannic acid and metakaolin.

TA can be used together with metakaolin (MK) as admixture for concrete. Table 2 shows the mix of three concrete mortar samples made without and with TA and metakaolin admixture. The strength of these samples are shown in FIG. 7. It can be seen that the compressive strength of the cement mortar has been improved nearly 70% by using the TA and metakaolin as admixture.

TABLE 2

Mix proportions (g) of concrete with metakaolin and TA as admixture

| | Cement | MK | Water | Sand | Soaking TA |
|---|---|---|---|---|---|
| Control | 1045 | — | 550 | 2860 | |
| MK-C | 836 | 209 | 550 | 2860 | |
| MK-TA | 836 | 209 | 550 | 2860 | YES |

Example 3: TA Used Together with Colloidal Silica

Figure 8:
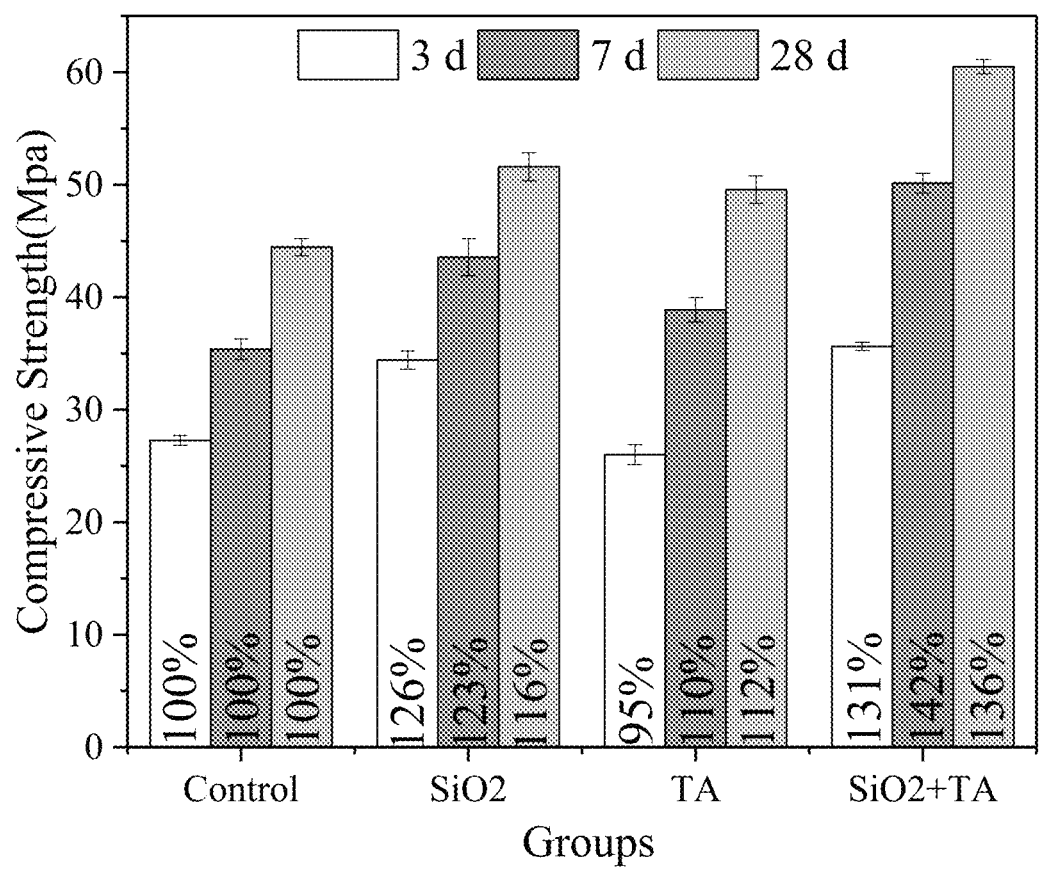
FIG. 8 is a bar graph showing the compressive strength of mortar samples comprising tannic acid and silica.
Figure 9:
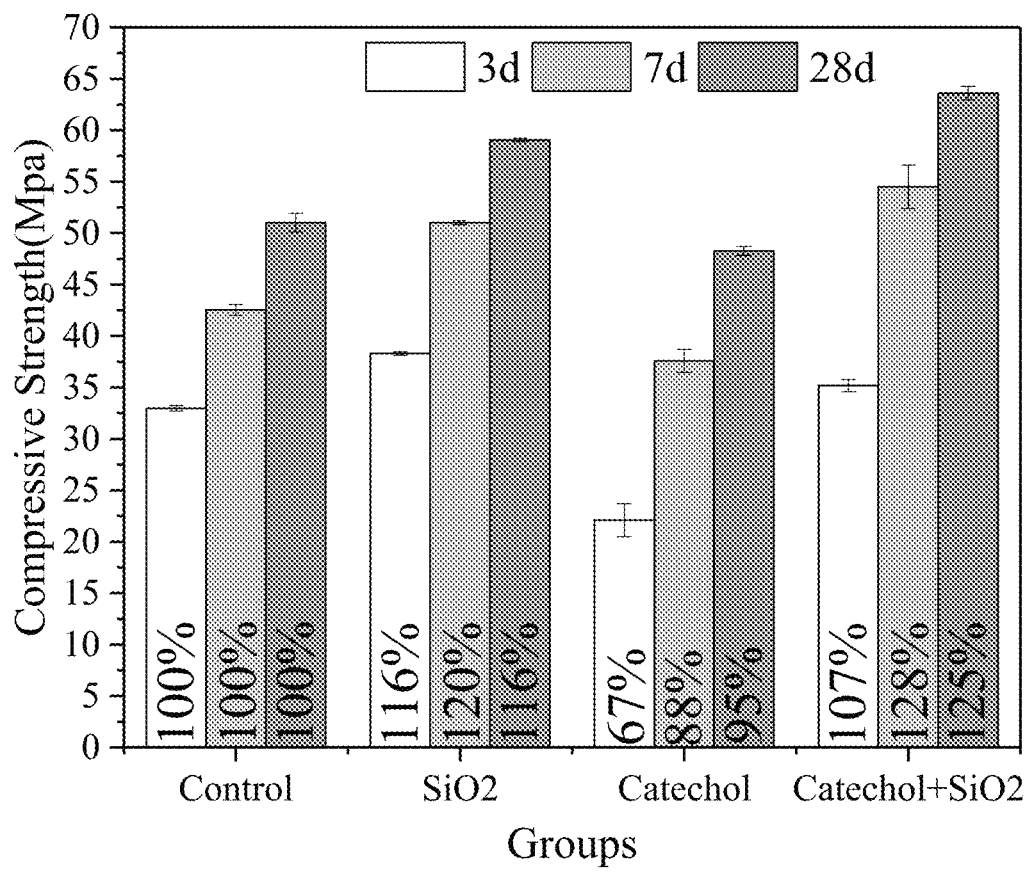
FIG. 9 is a bar graph showing the compressive strength of mortar samples comprising catechol and silica sol admixture.

TA can be used together with colloidal nanosilica as admixture for concrete. Table 3 shows the mix of four concrete mortar samples made without TA or colloidal silica, with colloidal silica only, with TA only, and with TA and colloidal nanosilica admixture. The strength of these samples are shown in FIG. 8. It can be seen that the compressive strength of the cement mortar at 28 days has been improved 36% by using the TA and colloidal nanosilica as admixture.

TABLE 3

Mix proportions (g) of cement mortar with TA and nanosilica as admixture

| | Cement | Colloidal nano-$SiO_2$ | TA | Water | Sand |
|---|---|---|---|---|---|
| Control | 1097 | — | — | 550 | 2860 |
| $SiO_2$ – TA | 1045 | 50 | — | 500 | 2860 |
| TA | 1097 | — | 2.2 | 550 | 2860 |
| $SiO_2$ + TA | 1045 | 50 | 2.2 | 500 | 2860 |

Example 4: Catechol Used Together with Silica Sol

Catechol was used together with silica sol as admixture for concrete. Table 4 shows the mix of four concrete mortar samples made without catechol or silica sol, with silica sol only, with catechol only, and with catechol and silica sol admixture. The strength of these samples are shown in Fg. 9. It can be seen that the compressive strength of the cement mortar at 28 d has been improved up to 25% by using the catechol and silica sol as admixture.

TABLE 4

Mix proportions (g) of cement mortar with catechol and colloidal nanosilica as admixture

| | Cement | Colloidal nano-$SiO_2$ | Catechol | Water | Sand* |
|---|---|---|---|---|---|
| Control | 1095 | — | — | 550 | 2860 |
| $SiO_2$ | 1045 | 50 | — | 500 | 2860 |
| Catechol | 1095 | — | 2 | 550 | 2860 |
| Catechol + $SiO_2$ | 1045 | 50 | 2 | 500 | 2860 |

*The sand is manufactured sand, not natural sand.

Example 5: Tannic Acid Used Together with Sodium Silicate Solution

Figure 10:
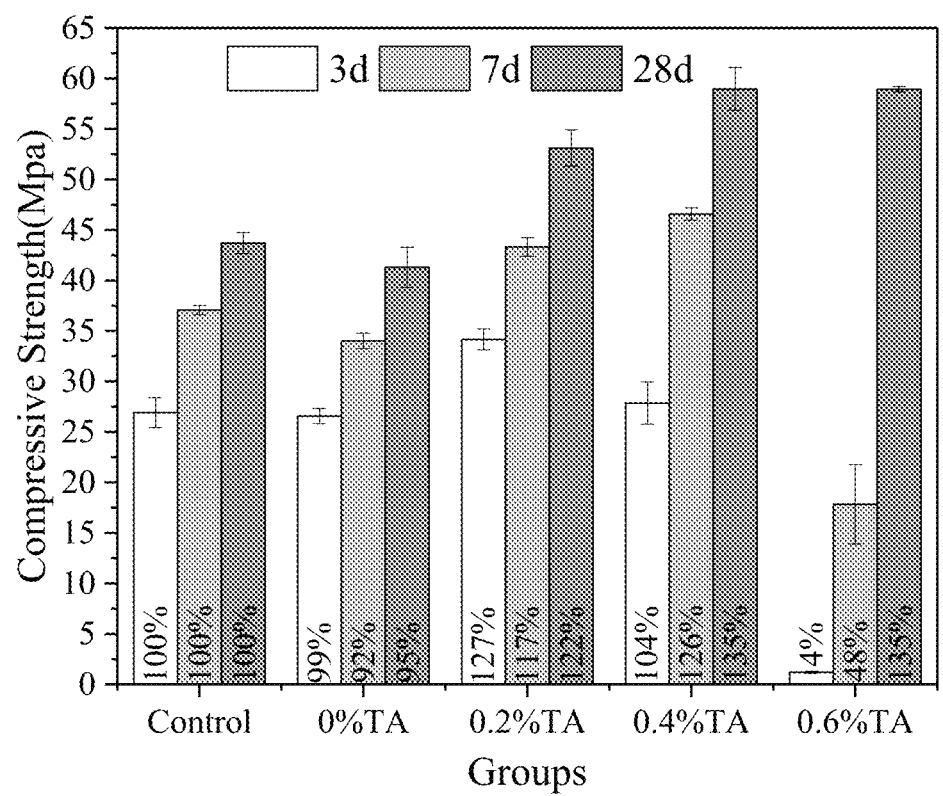
FIG. 10 is a bar graph showing the effect of the amount of tannic acid with sodium silicate solution on the compressive strength development of cement mortar.

Tannic acid was used together with sodium silicate (water glass (WG)) as admixture for concrete. Table 5 shows the mix of concrete mortar samples made without TA or sodium silicate, with sodium silicate only, and with sodium silicate solution and different contents of TA as admixture. Tannic acid was first mixed with the sodium silicate solution to make a suspension and then mixed with the remaining ingredients of the mortar. The strength of each sample is shown in FIG. 10. It can be seen that the compressive strength of the cement mortar at 28 d has been improved up to 35% by using the TA and sodium silicate as admixture.

TABLE 5

Mix proportions (g) of cement mortar with tannic acid and sodium silicate solution as admixture

| | Cement | Water | Sand | $Na_2SiO_3$ | TA |
|---|---|---|---|---|---|
| Control | 1045 | 550 | 2860 | — | — |
| $Na_2SiO_3$(12) | 1040 | 543 | 2860 | 12 | — |
| $Na_2SiO_3$(12) + 0.2% TA | 1040 | 543 | 2860 | 12 | 2 |
| $Na_2SiO_3$(12) + 0.4% TA | 1040 | 543 | 2860 | 12 | 4 |
| $Na_2SiO_3$(12) + 0.6% TA | 1040 | 543 | 2860 | 12 | 6 |

Example 6: Tannic Acid Used Together with Calcium Silicate Hydrate (CSH) Particles Tannic acid was used together with in-situ produced calcium silicate hydrate particles as admixture for concrete.

Figure 11:
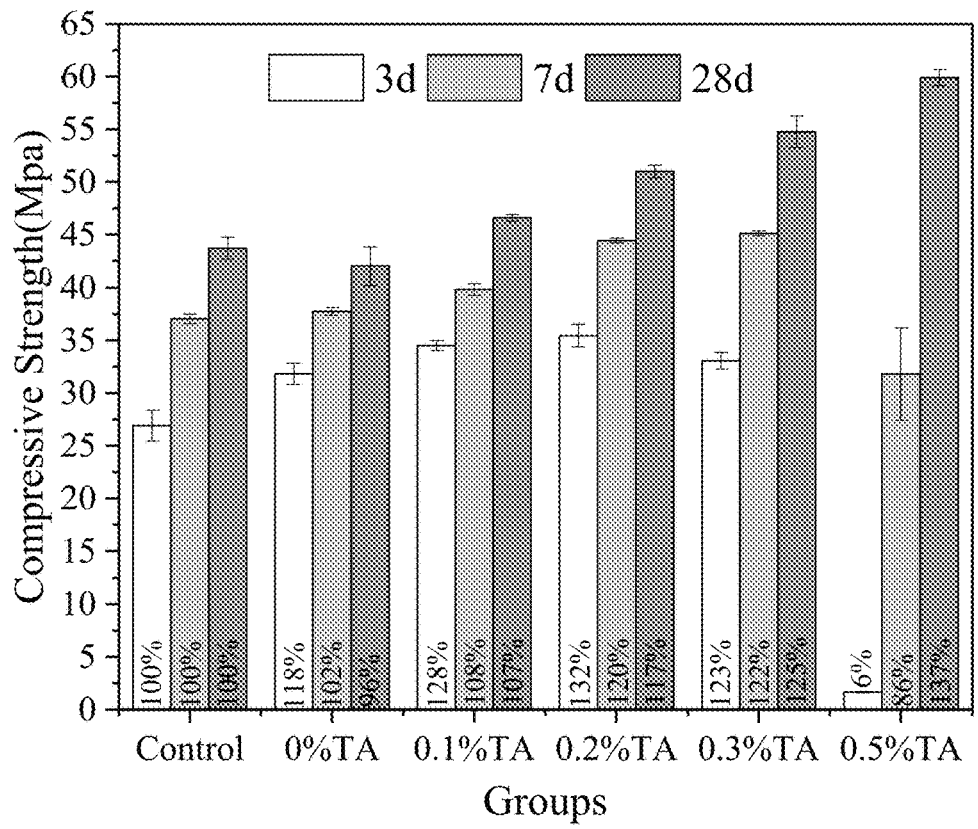
FIG. 11 is a bar graph showing the effect of the amount of tannic acid with calcium silicate hydrate on the compressive strength development of cement mortar.

Table 6 shows the mix of concrete mortar samples made without TA or CSH, with CSH only, and with CSH and different contents of TA as admixture. Tannic acid was first mixed with the sodium silicate solution and calcium nitrate to make a suspension of CSH, which was then mixed with the remaining ingredients of the mortar. The strength of these samples are shown in FIG. 11. It can be seen that the compressive strength of the cement mortar at 28 d has been improved 37% by using the TA together with CSH as admixture.

TABLE 6

Mix proportions (g) of cement mortar with tannic acid and CSH as admixture

| | Cement | Water | Sand | Na$_2$SiO$_3$ | Ca(NO$_3$)$_2$ | TA |
|---|---|---|---|---|---|---|
| Control | 1045 | 550 | 2860 | — | — | — |
| CSH(6) | 1039 | 543 | 2860 | 12 | 4.74 | — |
| CSH(6) + 0.1% TA | 1039 | 543 | 2860 | 12 | 4.74 | 1 |
| CSH(6) + 0.2% TA | 1039 | 543 | 2860 | 12 | 4.74 | 2 |
| CSH(6) + 0.3% TA | 1039 | 543 | 2860 | 12 | 4.74 | 3 |
| CSH(6) + 0.5% TA | 1039 | 543 | 2860 | 12 | 4.74 | 5 |
| CSH(9) | 1036 | 540 | 2860 | 18 | 7.11 | — |
| CSH(9) + 0.2% TA | 1036 | 540 | 2860 | 18 | 7.11 | 2 |

Example 7: Tannic Acid Used Together with Pre-Hydrated Cement Particles

Figure 12:
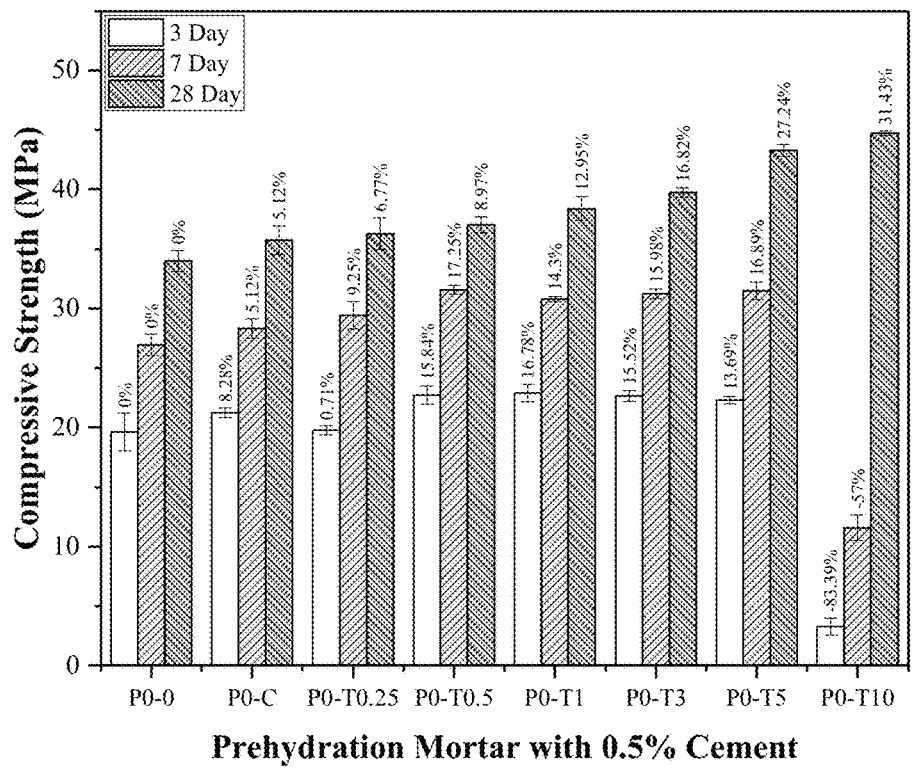
FIG. 12 is a bar graph showing compressive strength of cement mortar comprising tannic acid and pre-hydrated cement as admixture.

Tannic acid was used together with pre-hydrated cement particles as admixture for concrete. Table 7 shows the mix of concrete mortar samples made without TA or pre-hydrated cement particles, with 0.5% pre-hydrated cement particle, and with 0.5% pre-hydrated cement particles together with different contents of TA as admixture. The pre-hydrated cement and tannic acid suspension was made by mixing the tannic acid with 0.5% (weight of total cement) in water under stirring at rpm 900 for 6 hours. The produced suspension was then mixed with the remaining ingredients of the mortar. The strength of these samples are shown in FIG. 12. It can be seen that the compressive strength of the cement mortar at 28 d has been improved up to 31.43% by using the TA and the pre-hydrated cement particles.

TABLE 7

Mix proportions (g) of cement mortar with tannic acid and pre-hydrated cement as admixture

| | Cement (g) | Pre-hydration amount* (wt % of cement) | TA (wt % of cement) | Water (g) | Sand (g)** |
|---|---|---|---|---|---|
| P0-0 | 1068 | — | — | 587 | 3243 |
| P0-C | 1068 | 0.5 | — | 587 | 3243 |
| P0-T0.25 | 1068 | 0.5 | 0.025 | 587 | 3243 |
| P0-T0.5 | 1068 | 0.5 | 0.05 | 587 | 3243 |
| P0-T1 | 1068 | 0.5 | 0.1 | 587 | 3243 |
| P0-T3 | 1068 | 0.5 | 0.3 | 587 | 3243 |
| P0-T5 | 1068 | 0.5 | 0.5 | 587 | 3243 |
| P0-T10 | 1068 | 0.5 | 1 | 587 | 3243 |

Figure 13:
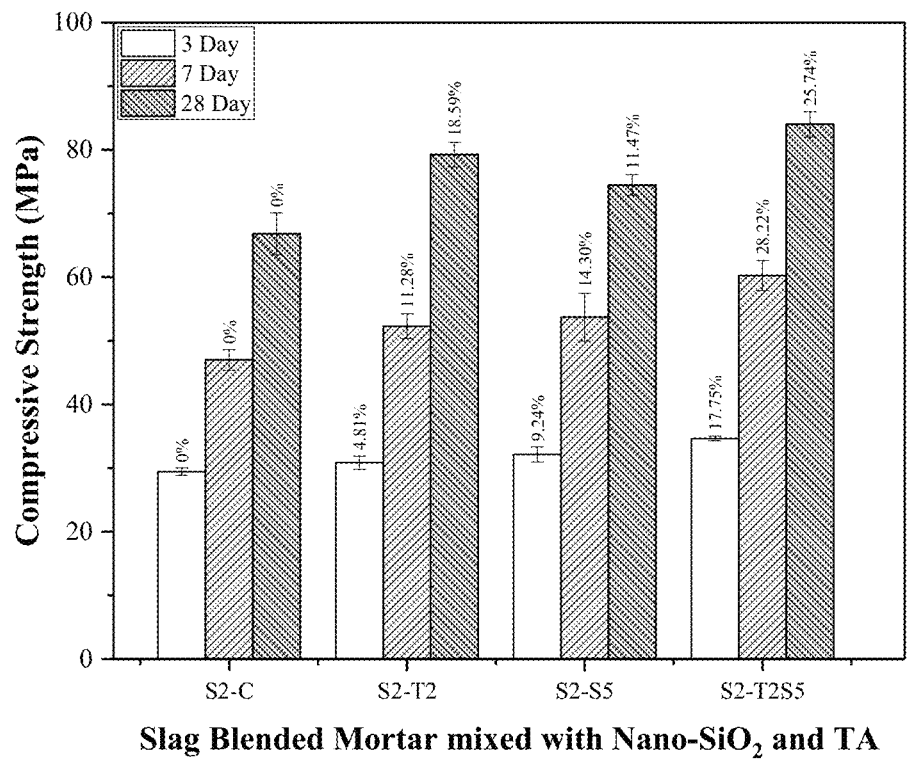
FIG. 13 is a bar graph showing compressive strength of slag-blended cement mortar comprising tannic acid and silica sol as admixture.

Example 8. Tannic Acid Used Together with Silica Sol for Slag Blended Cement Mortar Tannic acid was used together with silica sol as admixture for slag-blended Portland cement concrete. Slag is a supplementary cementitious material which can be used to partially replace Portland cement in concrete. Table 8 shows the mix of 20% slag-blended concrete mortar samples made without TA or silica sol, with tannic acid only, with 5% (in weight of cement) silica sol only, and with 5% (in weight of cement) silica sol and TA. The strength of these samples are shown in FIG. 13. It can be seen that the compressive strength of the slag-blended cement mortar at 28 d has been improved 26% by using the TA and silica sol as admixture.

TABLE 8

Mix proportions (g) of slag blended cement mortar with TA and silica sol as admixture

| | Cement (g) | Slag (g) | TA (g) | Silica-sol (g) | Water (g) | Sand (g)** |
|---|---|---|---|---|---|---|
| S2-C | 880 | 220 | — | — | 550 | 2960 |
| S2-T2 | 880 | 220 | 2.2 | — | 550 | 2960 |
| S2-S5 | 880 | 220 | — | 50 | 550 | 2960 |
| S2-T2S5 | 880 | 220 | 2.2 | 50 | 550 | 2960 |

*TA and colloidal nano-SiO$_2$ are solved in DI water separately and then mixed together.
**The sand is manufactured sand, not natural sand.

Figure 14:
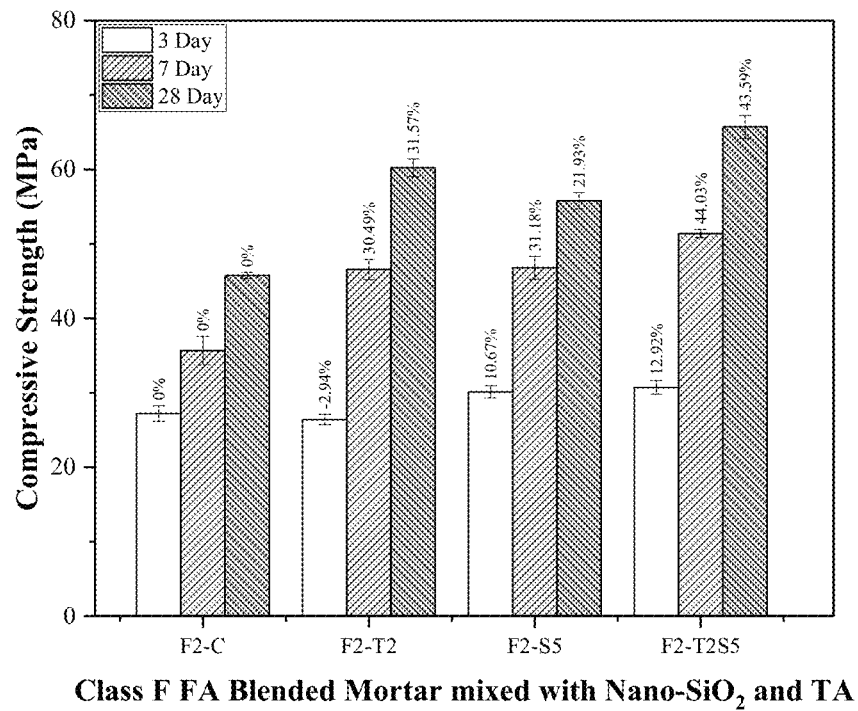
FIG. 14 is a bar graph showing compressive strength of cement mortar comprising tannic acid and silica sol as admixture.

Example 9. Tannic Acid Used Together with Silica Sol for Fly Ash Blended Cement Mortar Tannic acid was used together with silica sol as admixture for fly ash-blended Portland cement concrete. Fly ash is a supplementary cementitious material for concrete which can be used to partially replace Portland cement in concrete. Table 9 shows the mix of 20% fly ash-blended concrete mortar samples made without TA or fly ash, with tannic acid only, with 5% (in weight of cement) silica sol only, and with 5% (in weight of cement) silica sol and TA. The strength of these samples are shown in FIG. 14. It can be seen that the compressive strength of the slag-blended cement mortar at 28 d has been improved 44% by using the TA and silica sol as admixture.

TABLE 9

Mix proportions (g) of fly ash-blended cement mortar with TA and silica sol as admixture

| | Cement (g) | Class F Fly Ash (g) | TA (g) | Silica sol (g)* | Water (g) | Sand (g)** |
|---|---|---|---|---|---|---|
| F2-C | 880 | 220 | — | — | 550 | 2960 |
| F2-T2 | 880 | 220 | 2.2 | — | 550 | 2960 |
| F2-S5 | 880 | 220 | — | 50 | 550 | 2960 |
| F2-T2S5 | 880 | 220 | 2.2 | 50 | 550 | 2960 |

*TA and silica sol are solved in DI water separately and then mixed together.
**The sand is manufactured sand, not natural sand.

Figure 15:
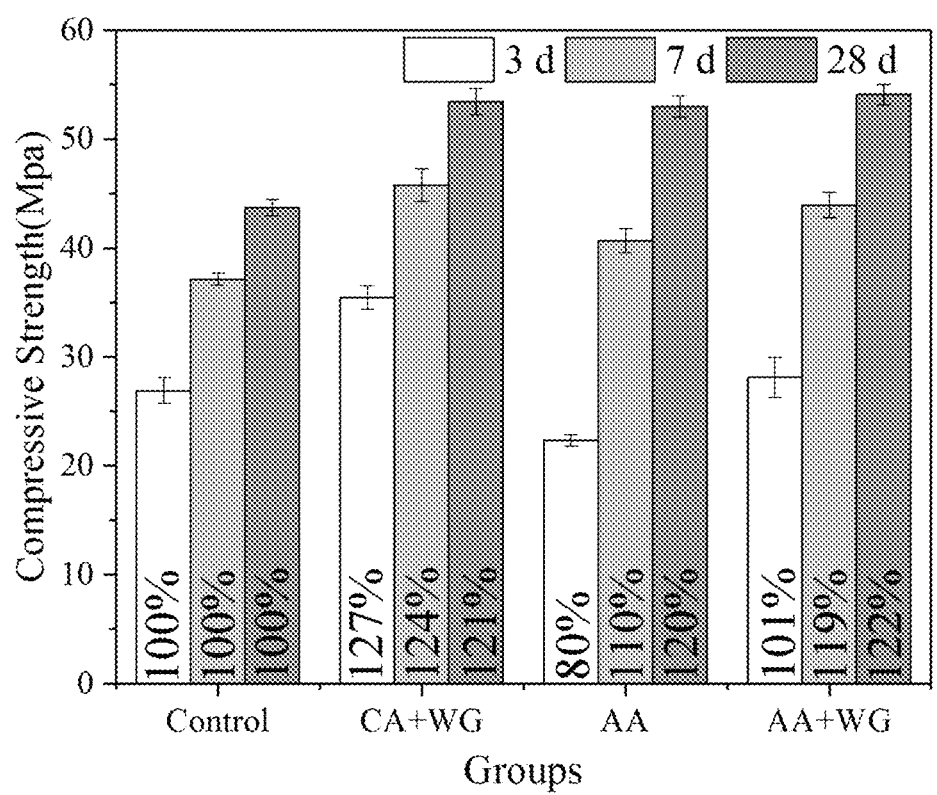
FIG. 15 is a bar graph showing compressive strength of cement mortar comprising ascorbic acid or citric acid and sodium silicate solution as admixture.

Example 10: Ascorbic Acid (Vitamin C) and Citric Acid Used Together with Sodium Silicate Solution Ascorbic acid and citric acid were used together with sodium silicate (water glass (WG)) as admixture for concrete. Table 10 shows the mix of concrete mortar samples made without ascorbic acid or citric acid (control group), with citric acid and water glass, with ascorbic acid only, and with ascorbic acid and sodium silicate solution as admixture. Ascorbic acid or citric acid was first mixed with the sodium silicate solution to make a suspension and then mixed with the rest ingredients of the mortar. The strength of these samples are shown in FIG. 15. It can be seen that the compressive strength of the cement mortar at 28 d has been improved 21% by using the citric acid and sodium silicate as admixture, and 22% by ascorbic acid and sodium silicate solution.

TABLE 10

Mix proportions (g) of citric acid or ascorbic acid blended cement mortar with and sodium silicate solution as admixture

|  | Cement | Water | Sand | $Na_2SiO_3$ | CA* | AA* |
|---|---|---|---|---|---|---|
| Control | 1045 | 550 | 2860 | — | — | — |
| CA + WG | 1040 | 543 | 2860 | 12 | 2 | — |
| AA** | 1045 | 540 | 2860 | — | — | 2 |
| AA + WG | 1040 | 540 | 2860 | 12 | — | 2 |

*WG: water glass/CA: Citric acid/AA: Ascorbic acid.
**delayed setting

The materials and methods of the appended claims are not limited in scope by the specific materials and methods described herein, which are intended as illustrations of a few aspects of the claims and any materials and methods that are functionally equivalent are within the scope of this disclosure. Various modifications of the materials and methods in addition to those shown and described herein are intended to fall within the scope of the appended claims. Further, while only certain representative materials, methods, and aspects of these materials and methods are specifically described, other materials and methods and combinations of various features of the materials and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A composition, comprising:
   a hydraulic cementitious material;
   a hydroxyl containing compound selected from the group consisting of water soluble polyhydroxy aromatic compounds, wherein the hydroxyl containing compound is present in an amount of from 0.1% to 3% by weight, based on the total weight of the cementitious material, and
   a particulate material and optionally a water soluble silicate-containing material that interacts with the hydroxyl containing compound,
   wherein the particulate material comprises nanoparticles present in an amount of from 0.2% to 5% by weight, based on the total weight of the cementitious material and the hydroxyl containing compound.

2. The composition of claim 1, wherein the hydraulic cementitious material is selected from the group consisting of ordinary Portland cement, calcium aluminate cement, calcium phosphate cement, calcium sulfate hydrate, calcium aluminate sulfonate cement, magnesium oxychloride cement, magnesium oxysulfate cement, magnesium phosphate cement, and combinations thereof.

3. The composition of claim 1, wherein the water soluble polyhydroxy aromatic compound has a molecular weight of from 50 to 9000 g/mol.

4. The composition of claim 1, wherein the water soluble polyhydroxy aromatic compound is a polyphenol, a polyhydroxy phenol, or a combination thereof.

5. The composition of claim 1, wherein the water soluble polyhydroxy aromatic compound comprises a tannin, a proanthocyanidin, a catechol, a gallic acid, or a combination thereof.

6. The composition of claim 1, wherein the water soluble polyhydroxy aromatic compound is present in an amount of from 0.1% to 1.5% by weight, based on the total weight of the cementitious material.

7. The composition of claim 1, wherein at least about 90% by weight of particles in the particulate material have a diameter of less than 2 mm.

8. The composition of claim 1, wherein the particulate material further comprises microparticles.

9. The composition of claim 1, wherein the particulate material comprises silica, clay, fibers, calcium silicate hydrate, calcium aluminate, magnesium oxide, lime, wollastonite, a water soluble silicate salt, or mixtures thereof.

10. The composition of claim 1, wherein the particulate material further comprises microparticles present in an amount of from 5% to 30% by weight, based on the total weight of the cementitious material and the hydroxyl containing compound.

11. The composition of claim 1, comprising the water soluble silicate-containing material, present in an amount of from 0.1% to 5% by weight, based on the total weight of the cementitious material and the hydroxyl containing compound.

12. The composition of claim 1, wherein at least a portion of the hydroxyl containing compound reacts with a surface of the particulate material or the water soluble silicate-containing material through covalent and/or noncovalent interactions.

13. The composition of claim 1, further comprising an aggregate.

14. A building material selected from concrete, a tile, a brick, a paver, a panel, or a synthetic stone comprising the cementitious composition of claim 1.

15. A method of making a cementitious composition according to claim 1, the method comprising:
   mixing a hydroxyl containing compound and a particulate material that interacts with the hydroxyl containing compound to form a slurry having a pH value higher than 4, and
   blending the slurry with a hydraulic cementitious material to produce a cementitious mixture,
   wherein the hydroxyl containing compound is selected from the group consisting of water soluble polyhydroxy aromatic compounds, wherein the hydroxyl containing compound is present in an amount of from 0.1% to 3% by weight, based on the total weight of the cementitious material and the hydroxyl containing compound, and
   wherein the particulate material comprises nanoparticles present in an amount of from 0.2% to 5% by weight, based on the total weight of the cementitious material and the hydroxyl containing compound.

16. The method of making a cementitious composition according to claim 15, the method further comprising:
   mixing the hydroxyl containing compound with a water soluble silicate salt or Portland cement particles.

17. The method of claim 16, further comprising reacting the water soluble silicate salt with an aqueous solution of a calcium salt.

18. A method of making a cementitious composition according to claim 1, the method comprising:
   mixing a hydroxyl containing compound, a particulate material, optionally a water soluble silicate-containing material that interacts with the hydroxyl containing compound, and a hydraulic cementitious material to produce a cementitious mixture, wherein the hydroxyl containing compound is selected from the group consisting of water soluble polyhydroxy aromatic compounds, wherein the hydroxyl containing compound is present in an amount of from 0.1% to 3% by weight, based on the total weight of the cementitious material and the hydroxyl containing compound, and wherein the particulate material comprises nanoparticles present in an amount of from 0.2% to 5% by weight, based on the total weight of the cementitious material and the hydroxyl containing compound.

19. The method of claim 18, further comprising hydrating the cementitious mixture.

20. The method of claim 18, wherein the cementitious composition after curing for 3 days, develops a compressive strength that is the same or at least about 0.1 MPa greater than the compressive strength of an identical composition not including the hydroxyl containing compound and the particulate material or the water soluble silicate-containing material.

21. The method of claim 18, wherein the cementitious composition after curing for 28 days, develops a compressive strength of at least about 20% or greater or at least about 10 MPa greater than the compressive strength of an identical composition not including the hydroxyl containing compound and the particulate material or the water soluble silicate-containing material.

22. A method for improving corrosion resistance of reinforcing steel bars embedded in concrete, comprising:

embedding the reinforcing steel bars in a cementitious composition, wherein the cementitious composition comprises:

a hydraulic cementitious material;

hydroxyl containing compound selected from the group consisting of a polyhydroxy aromatic compound, a polycarboxylic acid-containing compound or a salt thereof, ascorbic acid or a salt thereof, and a combination thereof, wherein the hydroxyl containing compound is present in an amount of from 0.1% to 3% by weight, based on the total weight of the cementitious material, and a particulate material and/or a water soluble silicate-containing material that interacts with the hydroxyl containing compound.

23. The method of claim 22, wherein the particulate material comprises nanoparticles present in an amount of from 0.2% to 5% by weight, based on the total weight of the cementitious material and the hydroxyl containing compound.

24. A composition, comprising:

a hydraulic cementitious material;

a hydroxyl containing compound selected from the group consisting of polyhydroxy aromatic compounds, wherein the polyhydroxy aromatic compound is present in an amount of from 0.1% to 1.5% by weight, based on the total weight of the cementitious material, and a particulate material and optionally a water soluble silicate-containing material that interacts with the hydroxyl containing compound, wherein the particulate material comprises nanoparticles present in an amount of from 0.2% to 5% by weight, based on the total weight of the cementitious material and the hydroxyl containing compound.

* * * * *